US008227381B2

(12) United States Patent
Rodrigues et al.

(10) Patent No.: US 8,227,381 B2
(45) Date of Patent: Jul. 24, 2012

(54) LOW MOLECULAR WEIGHT GRAFT COPOLYMERS FOR SCALE CONTROL

(75) Inventors: Klin A. Rodrigues, Signal Mountain, TN (US); Jannifer Sanders, Hixson, TN (US)

(73) Assignee: Akzo Nobel N.V., Arnhem (NL)

(*) Notice: Subject to any disclaimer, the term of this patent is extended or adjusted under 35 U.S.C. 154(b) by 12 days.

(21) Appl. No.: 12/888,618

(22) Filed: Sep. 23, 2010

(65) Prior Publication Data

US 2011/0046025 A1    Feb. 24, 2011

Related U.S. Application Data

(60) Division of application No. 11/780,494, filed on Jul. 20, 2007, which is a continuation-in-part of application No. 11/459,233, filed on Jul. 21, 2006, now abandoned.

(51) Int. Cl.
*C09K 8/52* (2006.01)
*C09K 8/528* (2006.01)
*C09K 8/68* (2006.01)
*C11D 3/22* (2006.01)
*C11D 3/37* (2006.01)

(52) U.S. Cl. ....... 507/90; 166/305.1; 507/211; 507/221; 507/224; 510/434; 510/471; 510/476; 510/477; 510/505; 525/7

(58) Field of Classification Search ............. 507/90, 507/211, 221, 224; 166/305.1; 510/434, 510/471, 476, 477, 505; 525/7
See application file for complete search history.

(56) References Cited

U.S. PATENT DOCUMENTS

| | | | |
|---|---|---|---|
| 2,536,658 A | 1/1951 | Rheineck |
| 2,798,053 A | 7/1957 | Brown |
| 2,954,347 A | 9/1960 | St. John et al. |
| 3,308,067 A | 3/1967 | Diehl |
| 3,314,891 A | 4/1967 | Schmolka et al. |
| 3,455,839 A | 7/1969 | Rauner |
| 3,518,176 A | 6/1970 | Reyes et al. |
| 3,629,121 A | 12/1971 | Eldib |
| 3,639,312 A | 2/1972 | Turner |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |
| 3,929,678 A | 12/1975 | Laughlin et al. |
| 3,933,672 A | 1/1976 | Bartolotta et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,412,934 A | 11/1983 | Chung et al. |
| 4,483,779 A | 11/1984 | Llenado et al. |
| 4,483,780 A | 11/1984 | Llenado |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,963,629 A | 10/1990 | Driemel et al. |
| 4,968,451 A | 11/1990 | Scheibel et al. |
| 5,032,659 A | 7/1991 | Heidel |
| 5,071,895 A | 12/1991 | Hughes et al. |
| 5,121,795 A | 6/1992 | Ewert et al. |
| 5,125,455 A | 6/1992 | Harris et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,296,470 A | 3/1994 | Vaslin et al. |
| 5,304,620 A | 4/1994 | Holtmyer et al. |

(Continued)

FOREIGN PATENT DOCUMENTS

CA    2074747    2/1993

(Continued)

OTHER PUBLICATIONS

Rosen, "Geminis: A new generation of surfactants," Chemtech, pp. 30-33 (Mar. 1993).
"Gemini Surfactants: A New Class of Self-Assembling Molecules," J. American Chemical Soc., vol. 115, pp. 10083-10090 (1993).
Kirk Othmer Encyclopedia of Chemical Technology, 3rd Ed, vol. 7, pp. 430-447 (John Wiley & Sons, Inc., 1979).
Kroschwitz, J.I.; Concise Encyclopedia of Polymer Science & Engineering, Ed., Wiley-Interscience, New York, p. 436 (1990).
Mark, Herman F., Concise Encyclopedia of Polymer Science and Technology, 3rd Ed., vol. 11, Wiley-Interscience, New York, p. 380 (2004).
Odian, George; Principles of Polymerization, 2nd Ed., Wiley-Interscience, New York, p. 424 (1981).

(Continued)

Primary Examiner — Timothy J. Kugel
(74) Attorney, Agent, or Firm — James C. Abruzzo

(57) ABSTRACT

Low molecular weight graft copolymer comprising a synthetic component formed from at least one or more olefinically unsaturated carboxylic acid monomers or salts thereof, and a natural component formed from a hydroxyl-containing natural moiety. The number average molecular weight of the graft copolymer is about 100,000 or less, and the weight percent of the natural component in the graft copolymer is about 50 wt % or greater based on total weight of the graft copolymer. Processes for preparing such graft copolymers are also disclosed.

18 Claims, No Drawings

U.S. PATENT DOCUMENTS

| | | |
|---|---|---|
| 5,326,864 A | 7/1994 | Besemer et al. |
| 5,332,528 A | 7/1994 | Pan et al. |
| 5,378,830 A | 1/1995 | Yeh |
| 5,412,026 A | 5/1995 | Holy et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,670,475 A | 9/1997 | Trinh et al. |
| 5,753,770 A | 5/1998 | Breitenbach et al. |
| 5,760,154 A | 6/1998 | Krause et al. |
| 5,852,069 A | 12/1998 | Meister et al. |
| 5,854,191 A | 12/1998 | Krause et al. |
| 5,854,321 A | 12/1998 | Krause et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,577 A | 11/2000 | Cripe et al. |
| 6,194,362 B1 | 2/2001 | Trinh et al. |
| 6,221,825 B1 | 4/2001 | Williams, Jr. et al. |
| 6,231,650 B1 | 5/2001 | Mallow et al. |
| 6,255,427 B1 | 7/2001 | Exner et al. |
| 6,365,561 B1 | 4/2002 | Vinson et al. |
| 6,372,708 B1 | 4/2002 | Kasturi et al. |
| 6,384,132 B1 | 5/2002 | Horley et al. |
| 6,423,775 B1 | 7/2002 | Brune et al. |
| 6,482,994 B2 | 11/2002 | Scheper et al. |
| 6,528,477 B2 | 3/2003 | Kasturi et al. |
| 6,573,234 B1 | 6/2003 | Sivik et al. |
| 6,589,926 B1 | 7/2003 | Vinson et al. |
| 6,627,590 B1 | 9/2003 | Sherry et al. |
| 6,645,925 B2 | 11/2003 | Sivik et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,867,262 B1 | 3/2005 | Angel et al. |
| 6,908,955 B2 | 6/2005 | Porsch et al. |
| 7,153,821 B2 | 12/2006 | Blokzijl et al. |
| 7,435,293 B2 | 10/2008 | Caveny et al. |
| 7,666,963 B2 | 2/2010 | Rodrigues et al. |
| 7,902,276 B2 | 3/2011 | Sakai et al. |
| 2002/0016282 A1 | 2/2002 | Kumar et al. |
| 2002/0173592 A1 | 11/2002 | Saeki et al. |
| 2003/0008793 A1 | 1/2003 | Takiguchi et al. |
| 2003/0008804 A1 | 1/2003 | Xu et al. |
| 2003/0092584 A1 | 5/2003 | Crews |
| 2004/0033929 A1 | 2/2004 | Bertleff et al. |
| 2004/0039137 A1 | 2/2004 | Heinemann et al. |
| 2004/0170596 A1 | 9/2004 | Hauschel et al. |
| 2004/0266655 A1 | 12/2004 | Baum et al. |
| 2005/0108832 A1 | 5/2005 | Torri et al. |
| 2005/0171287 A1 | 8/2005 | Baum et al. |
| 2005/0176878 A1 | 8/2005 | Ettl et al. |
| 2005/0215449 A1 | 9/2005 | Penninger et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2007/0021577 A1 | 1/2007 | Rodrigues et al. |
| 2007/0056900 A1 | 3/2007 | Mathauer et al. |
| 2007/0138105 A1 | 6/2007 | Takeda et al. |
| 2007/0260046 A1 | 11/2007 | Tomita et al. |
| 2008/0020948 A1 | 1/2008 | Rodrigues et al. |
| 2008/0020961 A1 | 1/2008 | Rodrigues et al. |
| 2008/0021167 A1 | 1/2008 | Rodrigues |
| 2008/0021168 A1 | 1/2008 | Rodrigues et al. |
| 2008/0230193 A1 | 9/2008 | Mori et al. |
| 2009/0011214 A1 | 1/2009 | Wang |
| 2009/0326165 A1 | 12/2009 | Patil et al. |
| 2010/0069280 A1 | 3/2010 | Rodrigues et al. |
| 2010/0236736 A1 | 9/2010 | Brockmeyer et al. |
| 2010/0280146 A1 | 11/2010 | Vanderlaan et al. |
| 2011/0034622 A1 | 2/2011 | Kawamura et al. |
| 2011/0118168 A1 | 5/2011 | Schunicht et al. |

FOREIGN PATENT DOCUMENTS

| | | |
|---|---|---|
| CN | 1087649 A | 6/1994 |
| CN | 101830015 A | 9/2010 |
| CN | 101863540 A | 10/2010 |
| CN | 102146150 A | 8/2011 |
| DE | 40 38 908 A1 | 6/1992 |
| EP | 0 130 756 A1 | 1/1985 |
| EP | 0 404 377 A1 | 12/1990 |
| EP | 0 405 917 A1 | 1/1991 |
| EP | 00438215 | 1/1991 |
| EP | 0 441 197 A2 | 8/1991 |
| EP | 0 526 800 A1 | 2/1993 |
| EP | 0 577 519 A1 | 1/1994 |
| EP | 0 605 084 A1 | 7/1994 |
| EP | 0 725 131 A1 | 8/1996 |
| EP | 1 007 529 B1 | 5/2002 |
| EP | 1 236 748 A1 | 9/2002 |
| EP | 1 022 294 B1 | 6/2005 |
| EP | 1 881 017 A2 | 1/2008 |
| EP | 1950232 A1 | 7/2008 |
| EP | 2 072 531 A1 | 6/2009 |
| EP | 2 138 560 B1 | 12/2009 |
| FR | 2 908 135 A1 | 5/2008 |
| FR | 2 927 083 A1 | 8/2009 |
| GB | 1137741 | 12/1968 |
| JP | 6-298866 | 10/1994 |
| JP | 11-343449 | 12/1999 |
| JP | 2005-120045 | 5/2005 |
| JP | 2010-47713 | 3/2010 |
| JP | 2011-195809 | 10/2011 |
| WO | WO 91/06637 | 5/1991 |
| WO | WO 92/06162 | 4/1992 |
| WO | WO 92/10433 | 6/1992 |
| WO | WO 93/02118 | 2/1993 |
| WO | WO 93/11214 | 6/1993 |
| WO | WO 93/19038 | 9/1993 |
| WO | WO 93/19146 | 9/1993 |
| WO | WO 94/09099 | 4/1994 |
| WO | WO 95/10591 | 4/1995 |
| WO | WO 95/26393 | 10/1995 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 99/02663 | 1/1999 |
| WO | WO 99/05082 | 2/1999 |
| WO | WO 99/05084 | 2/1999 |
| WO | WO 99/05241 | 2/1999 |
| WO | WO 99/05242 | 2/1999 |
| WO | WO 99/05243 | 2/1999 |
| WO | WO 99/05244 | 2/1999 |
| WO | WO 99/07656 | 2/1999 |

| WO | WO 99/20726 | | 4/1999 |
| WO | WO 99/27083 | | 6/1999 |
| WO | WO 00/23548 | | 4/2000 |
| WO | WO 00/23549 | | 4/2000 |
| WO | WO 00/47708 | | 8/2000 |
| WO | WO 01/32816 | A1 | 5/2001 |
| WO | WO 01/42408 | A2 | 6/2001 |
| WO | WO 03/042262 | A2 | 5/2003 |
| WO | WO 2005/012378 | A1 | 2/2005 |
| WO | WO 2005/059023 | A1 | 6/2005 |
| WO | WO 2006/026406 | A2 | 3/2006 |
| WO | WO 2008/089262 | A1 | 7/2008 |
| WO | WO 2010/144575 | A1 | 12/2010 |
| WO | WO 2011/008272 | A1 | 1/2011 |
| WO | WO 2011/014783 | A1 | 2/2011 |
| WO | WO 2011/017223 | A1 | 2/2011 |
| WO | WO 2011/025624 | A1 | 3/2011 |
| WO | WO 2011/044490 | A1 | 4/2011 |
| WO | WO 2011/135313 | A1 | 11/2011 |
| WO | WO 2012/000609 | A1 | 1/2012 |

OTHER PUBLICATIONS

Odian, Principles of Polymerization, 2nd Ed., John Wiley & Sons, p. 226, New York (1981).
Wurzburg, Modified Starches: Properties and Uses, Grafted Starches, Chpt. 10, pp. 149-172, CRC Press, Boca Raton (1986).
Dubois et al, "Colorimetric Method for Determination of Sugars and Related Substances," Analytical Chemistry, vol. 28, No. 3, pp. 350-356 ( Mar. 1956).
Kwei-Ping, et al, "Chain Transfer constant of Vinylpyrrolidone with Dextran," Institute of Polymer Research, vol. 66, pp. 828-829, May 1962.
Shen, et al, "Graft Copolymers of Vinyl Pyrrolidone on Dextran," Journal of Polymer Science, vol. 53, pp. 81-85 (1961).
Kahya, et al, "A Novel Copolymer: Starch-g-Polyvinylpyrrolidone," Starch/Starke 61 (2009), pp. 267-274.
English QPatent Abstract for European Patent Publication No. 0 577 519 A1.
English Abstract for Japanese Patent Publication No. JP 2005/120045 (Abstract No. 2005-359217/37).
European Search Report for EP Application No. 06015025.7; Nov. 12, 2006.
European Search Report for EP Application No. 07014413.4; Nov. 6, 2007.
European Search Report for EP Application No. 07014412.6; Oct. 18, 2007.
European Search Report for EP Application No. 07014412.6; Jan. 23, 2008.
European Search Report for EP Application No. 09175465.5; Jan. 14, 2010.
Questel QPatents Abstract for Japanese Patent Publication 11-343449.
Chinese Office Action Action mailed Jul. 1, 2010 for Patent Application No. 200710169190.X.
International Search Report for PCT Application No. US2010/043919; Completed Sep. 22, 2010.
International Search Report for PCT Application No. US2010/043930; Completed Sep. 23, 2010.
European Search Report for Application No. 11158599.8; Completion Date Aug. 11, 2011.
International Search Report and Written Opinion for Application No. PCTEP2011/073928; Completion Date Jan. 18, 2012.
English Abstract of Chinese Publication No. CN 101830015 A.
English Abstract of Chinese Publication No. CN 101863540 A.
English Abstract of Chinese Publication No. CN 102146150 A.
English Translation of European Publication No. EP 0 725 131 A1.
English Translation of European Publication No. EP 2 072 531 A1.
English Translation of French Publication No. FR 2 908 135 A1.
English Translation of French Publication No. FR 2 927 083 A1.
English Abstract of Japanese Publication No. JP 6-298866 A.
English Abstract of Japanese Publication No. JP 2010-47713 A.
English Abstract of Japanese Publication No. JP 2011-195809 A.
European Search Report for Application No. 12154675.8; Completion Date May 14, 2012.
European Search Report for Application No. 12154684.0; Completion Date May 14, 2012.

LOW MOLECULAR WEIGHT GRAFT COPOLYMERS FOR SCALE CONTROL

CROSS-REFERENCE TO RELATED APPLICATIONS

The present application is a divisional application of U.S. application Ser. No. 11/780,494, filed Jul. 20, 2007, currently pending, which is a continuation-in-part of U.S. application Ser. No. 11/459,233, filed Jul. 21, 2006, now abandoned.

The present invention relates to graft copolymers of synthetic and naturally derived materials. More particularly, the present invention is directed towards low molecular weight graft copolymers, as well as anti-sealant and/or dispersant formulations or compositions comprising such polymers and their use in aqueous systems, including scale minimization and dispersancy.

Many aqueous industrial systems require that various materials remain in a soluble, suspended or dispersed state. Examples of such aqueous systems include boiler water or steam generating systems, cooling water systems, gas scrubbing systems, pulp and paper mill systems, desalination systems, fabric, dishware and hard surface cleaning systems, as well as downhole systems encountered during the production of gas, oil, and geothermal wells. Often the water in those systems either naturally or by contamination contains ingredients such as inorganic salts. These salts can cause accumulation, deposition, and fouling problems in aqueous systems such as those mentioned above if they are not kept in a soluble, suspended or dispersed state.

Inorganic salts are typically formed by the reaction of metal cations (e.g., calcium, magnesium or barium) with inorganic anions (e.g., phosphate, carbonate or sulfate). When formed, the salts tend to be insoluble or have low solubility in water. As their concentration in solution increases, or as the pH and/or temperature of the solution containing those salts changes, the salts can precipitate from solution, crystallize and form hard deposits or scale on surfaces. This scale formation is a problem in equipment such as heat transfer devices, boilers, secondary oil recovery wells, and automatic dishwashers, as well as on substrates washed with such hard waters, causing a reduction in the performance and life of the equipment.

In addition to scale formation many cooling water systems made from carbon steel, for example, industrial cooling towers and heat exchangers, experience corrosion problems. Attempts to prevent this corrosion are often made by adding various inhibitors such as orthophosphate and/or zinc compounds to the water. However, phosphate addition increases the formation of highly insoluble phosphate salts such as calcium phosphate. The addition of zinc compounds can lead to precipitation of insoluble salts such as zinc hydroxide and zinc phosphate.

Other inorganic particulates such as mud, silt and clay can also be commonly found in cooling water systems. These particulates tend to settle onto surfaces, thereby restricting water flow and heat transfer unless they are effectively dispersed. Synthetic polymers such as polyacrylic acid are well known as excellent dispersants for these inorganic particulates.

Stabilization of aqueous systems containing scale-forming salts and inorganic to particulates involves a variety of mechanisms. Dispersion of precipitated salt crystals in an aqueous solution is one conventional mechanism for eliminating the deleterious effect of scale-forming salts. In this mechanism, the precipitates remain dispersed, as opposed to settling or dissolving in the aqueous solution. Synthetic polymers having carboxylic acid groups function as good dispersants for precipitated salts such as calcium carbonates.

Another stabilization mechanism is inhibiting the formation of scale-forming salts. In inhibition, synthetic polymer(s) that can increase the solubility of scale-forming salts in an aqueous system are added.

A third stabilization mechanism involves interference and distortion of the crystal structure of the scale by introduction of certain synthetic polymer(s), thereby making the scale less adherent to surfaces, other forming crystals and/or existing particulates.

Synthetic polymers such as polyacrylic acid have been used to minimize scale formation in aqueous treatment systems for a number of years. Synthetic polymers can also impart many useful functions in cleaning compositions. For example, polyacrylic acid is widely used as a viscosity reducer in processing powdered detergents. Synthetic polymers can also serve as anti-redeposition agents, dispersants, scale and deposit inhibitors, and/or crystal modifiers, thereby improving whiteness maintenance in the washing process. However, lately there has been a shortage of petroleum-based monomers required to produce these synthetic polymers due to rising demand and tight crude oil supplies. Hence, there is a need to replace these synthetic polymers with other copolymers that are at least partially derived from renewal natural sources. Such naturally derived polymers will have a better biodegradable profile than synthetic polymers, which tend to be non-biodegradable.

Cleaning formulations can contain builders such as phosphates and carbonates for boosting their cleaning performance. These builders tend to precipitate out in the form of insoluble salts such as calcium carbonate, calcium phosphate, and calcium orthophosphate. The precipitants form deposits on clothes and dishware, resulting in unsightly films and spots on these articles. Similarly, these insoluble salts can cause major problem in downhole oilfield applications. Synthetic polymers such as polyacrylic acid are widely used to minimize the scaling of insoluble salts in water treatment, oilfield and cleaning formulations.

A number of attempts have been made in the past to use natural materials as polymeric building blocks. These have mainly centered on grafting natural materials (e.g., sugars and starches) with synthetic monomers. For example, U.S. Pat. Nos. 5,854,191, 5,223,171, 5,227,446 and 5,296,470 disclose the use of graft copolymers in cleaning applications. U.S. Pat. Nos. 5,580,154 and 5,580,941 disclose sulfonated monomers grafted on to mono-, di- and oligosaccharides.

Unfortunately, graft copolymers typically do not perform as well as synthetic polymers in applications such as those described above (e.g., inhibition, dispersion and/or interference). Therefore, there is a need for graft copolymers that perform at least as well as their synthetic counterparts.

Further, previous attempts at graft copolymers have resulted in copolymers having relatively low amounts of the natural component or constituent. With increasing shortages of crude oil and petroleum derivatives, there is a need to increase the level of natural component of these graft copolymers. Doing so will result in copolymers that are less expensive and more environmentally friendly in that the copolymers will be produced from predominantly renewable raw materials.

Finally, many of the graft copolymers described in the art, especially those containing maleic acid, tend to be extremely dark colored solutions. This dark coloring is not desirable in cleansing (e.g., detergent) applications. Accordingly, there is a need for graft copolymers useful in cleansing applications that provide light or clear colored solutions.

The present invention discloses low molecular weight graft copolymers that function as an effective and at least partial replacement for synthetic polymers (e.g., polyacrylic acid) used in dispersancy applications in aqueous treatment systems. Additionally, the present invention discloses graft copolymers having a high degree of the natural component or constituent. Finally, the present invention discloses low or slightly colored graft copolymers and the processes for preparing these copolymers.

Low molecular weight graft copolymers according to the present invention are effective at minimizing a number of different scales, including phosphate, sulfonate, carbonate and silicate based scales. The scale-minimizing polymers are useful in a variety of systems, including water treatment compositions, oil field related compositions, cement compositions, cleaning formulations and other aqueous treatment compositions. Polymers according to the present invention have been found to be particularly useful in minimizing to scale by dispersing precipitants, inhibiting scale formation, and/or interference and distortion of crystal structure.

It has now been found that low molecular weight graft copolymer may be produced by grafting synthetic monomers onto hydroxyl-containing natural moieties. The resulting materials provide the performance of synthetic polymers while making use of lower cost, readily available and environmentally friendly materials derived from renewable sources. These materials can be used in water treatment, detergent, oil field and other dispersant applications.

The low molecular weight graft copolymer is useful as a dispersant in water treatment and oilfield applications. In water treatment compositions, the polymer is present in an amount of about 0.001% to about 25% by weight of the composition.

The present invention further provides a process for making lighter color graft copolymers. In one aspect, this can be achieved by carrying out the polymerization reaction at acidic pH. Additionally, use of copper salts and lower feed times in the process allows for production of products low in color.

As such, the present invention provides for low molecular weight graft copolymers having a synthetic component formed from at least one or more olefinically unsaturated carboxylic acid monomers or salts thereof, and a natural component formed from a hydroxyl-containing natural moiety. The number average molecular weight of the graft copolymer is about 100,000 or less, and the weight percent of the natural component in the graft copolymer is about 5 wt % or greater based on total weight of the graft copolymer.

In one embodiment, the synthetic component in graft copolymers according to the present invention is further formed from one or more monomers having a nonionic, hydrophobic and/or sulfonic acid group, wherein the one or more monomers are incorporated into the copolymer in an amount of about 50 weight percent or less based on total weight of the graft copolymer. In another aspect, the one or more monomers are incorporated into the copolymer in an amount of about 10 weight percent or less based on total weight of the graft copolymer.

The hydroxyl-containing natural moiety of the graft copolymer can be water soluble. In another aspect, the hydroxyl-containing natural moiety is degraded.

The carboxylic acid monomer of the graft copolymer can be, for example, acrylic acid, maleic acid, methacrylic acid or mixtures thereof. In one aspect, the carboxylic acid monomer is acrylic acid. In another aspect, the carboxylic acid monomer is acrylic acid and maleic acid.

According to the present invention, the weight percent of the natural component in the graft copolymer can be about 50 wt % or greater based on total weight of the graft copolymer. Examples of the natural component include glycerol, citric acid, maltodextrins, pyrodextrins, corn syrups, maltose, sucrose, low molecular weight oxidized starches and mixtures thereof.

In another aspect the present invention is directed towards cleaning compositions comprising the graft copolymer according to the present invention. The graft copolymer can be present in the cleaning composition in an amount of from about 0.01 to about 10 weight %, based on total weight of the cleaning composition. The cleaning composition can include one or more adjuvants. Further, the cleaning composition can be a detergent composition, with the graft copolymer having a Gardner color of about 12 or less. In one aspect, the detergent composition can be a powdered detergent or unit dose composition. In another aspect, the detergent composition can be an autodish composition. In even a further aspect, the detergent composition can be a zero phosphate composition.

The present invention is also directed towards a method of reducing spotting and/or filming in the rinse cycle of an automatic dishwasher by adding to the rinse cycle a rinse aid composition comprising a graft copolymer according to the present invention. In another embodiment, the present invention is directed towards a method of improving sequestration, threshold inhibition and soil removal in a cleaning composition by adding a graft copolymer according to the present invention to a cleaning composition.

In another embodiment, the present invention is directed towards water treatment systems comprising graft copolymers according to the present invention. The graft copolymer can be present in the system in an amount of at least about 0.5 mg/L. In another embodiment, the present invention is directed towards a method of dispersing and/or minimizing scale in an aqueous system by adding a graft copolymer according to the present invention to a water treatment system.

In another embodiment, the present invention is directed towards a method of dispersing pigments and/or minerals in an aqueous system by adding a dispersant composition comprising a graft copolymer according to the present invention to the aqueous system. In one aspect, the minerals dispersed include, for example, titanium dioxide, kaolin clays, modified kaolin clays, calcium carbonates and synthetic calcium carbonates, iron oxides, carbon black, talc, mica, silica, silicates, aluminum oxide or mixtures thereof.

In one embodiment, the present invention is directed towards a method of dispersing soils and/or dirt from hard and/or soft surfaces by treating the hard and/or soft surfaces with a cleaning composition comprising a graft copolymer according to the present invention. In another aspect, the present invention is directed towards a method of dispersing soils and/or dirt in aqueous systems by treating the aqueous system with an aqueous treatment composition comprising a graft copolymer according to the present invention.

The present invention also provides for a process for producing low molecular weight graft copolymers having a synthetic component and a natural component. The process includes degrading the natural component to a number average molecular weight of about 100,000 or less, reacting the natural component with a free radical initiating system having a metal ion to generate free radicals on the natural component, and polymerizing the free radical-containing natural component with a synthetic component. The resultant low molecular weight graft copolymer has a Gardner color of about 12 or less. The process can also include polymerizing the free radical-containing natural component with the synthetic component at ambient pressure and a reaction temperature of about 40° C. to about 130° C. The metal ion in the free radical initiating system can be a Cu (II) salt. In one aspect, polymerization can occur at a pH of about 6 or less.

Low molecular weight graft copolymers according to the present invention are produced by grafting synthetic monomers onto hydroxyl-containing naturally derived materials. These hydroxyl-containing naturally derived materials range from small molecules such as glycerol, citric acid, lactic acid, tartaric acid, gluconic acid, glucoheptonic acid, monosaccharides and disaccharides such as sugars, to larger molecules such as oligosaccharides and polysaccharides (e.g., maltodextrins and starches). Examples of these include sucrose, fructose, maltose, glucose, and saccharose, as well as reaction products of saccharides such as mannitol, sorbitol and so forth.

Use of natural materials to produce a low molecular weight graft copolymer is an attractive and readily available substitute for current synthetic materials. For example, glycerol is a by-product of biodiesel production. Glycerol is also a by-product of oils and fats used in the manufacture of soaps and fatty acids. It can also be produced by fermentation of sugar. Citric acid is produced industrially by fermentation of crude sugar solutions. Lactic acid is produced commercially by fermentation of whey, cornstarch, potatoes, molasses, etc. Tartaric acid is one byproduct of the wine making process.

Polysaccharides useful in the present invention can also be derived from plant, animal and microbial sources. Examples of such polysaccharides include starch, cellulose, gums (e.g., gum arabic, guar and xanthan), alginates, pectin and gellan. Starches include those derived from maize and conventional hybrids of maize, such as waxy maize and high amylose (greater than 40% amylase) maize, as well as other starches such as potato, tapioca, wheat, rice, pea, sago, oat, barley, rye, and amaranth, including conventional hybrids or genetically engineered materials. Also included are hemicellulose or plant cell wall polysaccharides such as D-xylans. Examples of plant cell wall polysaccharides include arabino-xylans such as corn fiber gum, a component of corn fiber.

Useful polysaccharides should be water soluble during the reaction. This implies that the polysaccharides either have a molecular weight low enough to be water soluble or can be hydrolyzed in situ during the reaction to become water soluble. For example, non-degraded starches are not water soluble. However, degraded starches are water soluble and can be used.

Accordingly, hydroxyl-containing natural materials include oxidatively, hydrolytically or enzymatically degraded monosaccharides, oligosaccharides and polysaccharides, as well as chemically modified monosaccharides, oligosaccharides and polysaccharides. Chemically modified derivatives include carboxylates, sulfonates, phosphates, phosphonates, aldehydes, silanes, alkyl glycosides, alkyl-hydroxyalkyls, carboxy-alkyl ethers and other derivatives. The polysaccharide can be chemically modified before, during or after the grafting reaction.

Generally speaking, degraded polysaccharides according to the present invention can have a number average molecular weight of about 100,000 or lower. In one aspect, the number average molecular weight (Mn) of the low molecular weight graft copolymer is about 25,000 or less. In another aspect, the degraded polysaccharides have a number average molecular weight of about 10,000 or less.

Polysaccharides useful in the present invention further include pyrodextrins. Pyrodextrins are made by heating acidified, commercially dry starch to a high temperature. Extensive degradation occurs initially due to the usual moisture present in starch. However, unlike the above reactions that are done in aqueous solution, pyrodextrins are formed by heating powders. As moisture is driven off by the heating, hydrolysis stops and recombination of hydrolyzed starch fragments occur. This recombination reaction makes these materials distinct from maltodextrins, which are hydrolyzed starch fragments. The resulting pyrodextrin product also has much lower reducing sugar content, as well as color and a distinct odor.

Other polysaccharides useful in this invention include maltodextrins, which are polymers having D-glucose units linked primarily by α-1,4 bonds and a dextrose equivalent ('DE') of less than about 20. Dextrose equivalent is a measure of the extent of starch hydrolysis. It is determined by measuring the amount of reducing sugars in a sample relative to dextrose (glucose). The DE of dextrose is 100, representing 100% hydrolysis. The DE value gives the extent of hydrolysis (e.g., 10 DE is more hydrolyzed than 5 DE maltodextrin). Maltodextrins are available as a white powder or concentrated solution and are prepared by the partial hydrolysis of starch with acid and/or enzymes.

Polysaccharides useful in the present invention can further include corn syrups. Corn syrups are defined as degraded starch products having a DE of 27 to 95. Examples of specialty corn syrups include high fructose corn syrup and high maltose corn syrup. Monosaccharides and oligosaccharides such as galactose, mannose, sucrose, ribose, trehalose, lactose, etc., can be used.

Polysaccharides can be modified or derivatized by etherification (e.g., via treatment with propylene oxide, ethylene oxide, 2,3-epoxypropyl trimethyl ammonium chloride), esterification (e.g., via reaction with acetic anhydride, octenyl succinic anhydride ('OSA')), acid hydrolysis, dextrinization, oxidation or enzyme treatment (e.g., starch modified with α-amylase, β-amylase, pullanase, isoamylase or glucoamylase), or various combinations of these treatments. These treatments can be performed before or after the graft copolymerization process.

In one aspect the natural component of the low molecular weight graft copolymer is glycerol, citric acid, maltodextrins and/or low molecular weight oxidized starches.

Low molecular weight graft copolymers according to the present invention are grafted using olefinically unsaturated carboxylic acid monomers as the synthetic component. As used herein, olefinically unsaturated carboxylic acid monomers include, for example, aliphatic, branched or cyclic, mono- or dicarboxylic acids, the alkali or alkaline earth metal or ammonium salts thereof, and the anhydrides thereof. Examples of such olefinically unsaturated carboxylic acid monomers include but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, and 2-acryloxypropionic acid. Moieties such as maleic anhydride or acrylamide that can be derivatized to an acid containing group can be used. Combinations of olefinically unsaturated carboxylic acid monomers can also be used. In one aspect the olefinically unsaturated carboxylic acid monomer is acrylic acid, maleic acid, or methacrylic acid, or mixtures thereof.

Small amounts of other monomers can optionally be added to the graft copolymerization process without any significant drop in performance. These optional monomers can be a monomer with a non-ionic, hydrophobic or sulfonic acid group. The monomer can be incorporated into the copolymer at about 50 or less weight percent based on total weight of the low molecular weight graft copolymer. In another aspect, the optional monomer can be added at about 10 or less weight percent of the graft copolymer. In even another aspect, the optional monomer can be added at about 4 or less weight percent of the graft copolymer.

Examples of optional monomers with sulfonic acid groups include 2-acrylatnido-2-methyl propane sulfonic acid, vinyl sulfonic acid, sodium methallyl sulfonate, sulfonated styrene, allyloxybenzene sulfonic acid and combinations thereof.

Examples of optional hydrophobic monomers include saturated or unsaturated alkyl, hydroxyalkyl, alkylalkoxy groups, arylalkoxy, alkarylalkoxy, aryl and aryl-alkyl groups, alkyl sulfonate, aryl sulfonate, siloxane and combinations thereof. Examples of hydrophobic monomers include styrene, α-methyl styrene, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenyl butyl) styrene. Combinations of hydrophobic monomers can also be used.

Examples of optional non-ionic monomers include $C_1$-$C_6$ alkyl esters of (meth)acrylic acid and the alkali or alkaline earth metal or ammonium salts thereof, acrylamide and the $C_1$-$C_6$ alkyl-substituted acrylamides, the N-alkyl-substituted acrylamides and the N-alkanol-substituted acrylamides, hydroxyl alkyl acrylates and acrylamides. Also useful are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid and valeric acid. In one aspect the nonionic monomers are selected from the group consisting of methyl methacrylate, methyl acrylate, hydroxyethyl (meth)acrylate and hydroxypropyl(meth)acrylate.

Low molecular weight copolymers according to the present invention perform similar to their synthetic counterparts, even at relatively high levels of the natural component within the copolymer. For example, the natural component of the low molecular weight graft copolymer can be from about 10 to about 95 weight % based on total weight of the polymer. In one aspect, the range is from about 20 to about 85 weight % of the natural component based on total weight of the polymer. In another aspect, the weight percent of the natural component in the low molecular weight graft copolymer is about 40 wt % or greater based on total weight of the polymer. In even another aspect, the weight percent of the natural component in the low molecular weight graft copolymer is about 60 wt % or greater. In another aspect, the weight percent of the natural component in the low molecular weight graft copolymer is about 80 wt % or greater.

In contrast, materials described in the art (exemplified in the comparative examples below) tend to drop in performance when the amount of natural component is increased. This level depends on the monomers used and the end use application of the product. For example, in the case of acrylic acid grafted materials used in dispersant application, low molecular weight copolymers according to the present invention perform similar to their synthetic counterpart, even when the level of natural component is greater than 50, and even 65 weight percent of the polymer (see, e.g., Examples 6 and 7 infra), whereas graft copolymers found in the art do not (see, e.g., Comparative Example 1 infra).

Further, it has been difficult in the past to produce polymers having a natural component of greater than 50 weight percent as the solutions often phase separate out. However, low molecular weight graft copolymers according to the present invention can be synthesized using 75, 85 and even 95 weight percent of the natural component (see, e.g., Examples 8, 9 and 10 infra). In the case of maleic acid where the end use application is dispersancy or anti-redeposition, materials found in the prior art tend to lose their efficacy at levels as low as 25 weight percent of the natural component (see, e.g., Comparative Example 2, illustrating in Example 24 poor anti-redeposition versus the inventive polymer of Example 4).

In one aspect, the number average molecular weight (Mn) of the low molecular weight graft copolymer is less than 100,000. In another aspect, the number average molecular weight of the low molecular weight graft copolymer is less than 25,000. In another aspect, the number average molecular weight of the polymer is less than 10,000. Optimum molecular weight depends on the monomers used in the grafting process and end use application. For example, acrylic acid grafted materials have been found to be excellent dispersants at Mn of less than 10,000.

The lower the molecular weights of the natural component, the lower the molecular weight of the resulting graft copolymer. In one aspect, the natural component has a number average molecular weight of about 100,000 or lower. In another aspect, the natural component has a number average molecular weight of about 10,000 or lower. Natural component include materials such as maltodextrins and corn syrups having a DE of about 5 or greater. In another aspect, natural components have a DE of about 10 or greater.

Low molecular weight graft copolymers according to the present invention have been found to be excellent dispersants in a wide variety of aqueous systems. These systems include but are not limited to water treatment, cleaning formulations, oilfield and pigment dispersion. These systems are described in further detail below. In another aspect, the low molecular weight graft copolymers have been found to be excellent sizing agents for fiberglass, non-wovens and textiles.

Cleaning Formulations—

Low molecular weight graft copolymers according to the present invention can also be used in a variety of cleaning formulations. Such formulations include both powdered and liquid laundry formulations such as compact and heavy duty detergents (e.g., builders, surfactants, enzymes, etc.), automatic dishwashing detergent formulations (e.g., builders, surfactants, enzymes, etc.), light-duty liquid dishwashing formulations, rinse aid formulations (e.g., acid, nonionic low foaming surfactants, carrier, etc.) and/or hard surface cleaning formulations (e.g., zwitterionic surfactants, germicide, etc.).

The graft copolymers can be used as viscosity reducers in processing powdered detergents. They can also serve as anti-redeposition agents, dispersants, scale and deposit inhibitors, and crystal modifiers, providing whiteness maintenance in the washing process.

Any suitable adjunct ingredient in any suitable amount can be used in the cleaning formulations described herein. Useful adjunct ingredients include, but are not limited to, aesthetic agents, anti-filming agents, antiredeposition agents, anti-spotting agents, beads, binders, bleach activators, bleach catalysts, bleach stabilizing systems, bleaching agents, brighteners, buffering agents, builders, carriers, chelants, clay, color speckles, control release agents, corrosion inhibitors, dishcare agents, disinfectant, dispersant agents, draining promoting agents, drying agents, dyes, dye transfer inhibiting agents, enzymes, enzyme stabilizing systems, fillers, free radical inhibitors, fungicides, germicides, hydrotropes, opacifiers, perfumes, pH adjusting agents, pigments, processing aids, silicates, soil release agents, suds suppressors, surfactants, stabilizers, thickeners, zeolite, and mixtures thereof.

The cleaning formulations can further include builders, enzymes, surfactants, bleaching agents, bleach modifying materials, carriers, acids, corrosion inhibitors and aesthetic agents. Suitable builders include, but are not limited to, alkali metals, ammonium and alkanol ammonium salts of polyphosphates, alkali metal silicates, alkaline earth and alkali metal carbonates, nitrilotriacetic acids, polycarboxylates, (such as citric acid, mellitic acid, succinic acid, oxydisuccinic acid, polymaleic acid, benzene 1,3,5-tricarboxylic acid, carboxymethyl oxysuccinic acid, and water-soluble salts thereof), phosphates (e.g., sodium tripolyphosphate), and mixtures thereof. Suitable enzymes include, but are not limited to, proteases, amylases, cellulases, lipases, carbohydrases, bleaching enzymes, cutinases, esterases, and wild-type enzymes. Suitable surfactants include, but are not limited to, nonionic surfactants, anionic surfactants, cationic surfactants, ampholytic surfactants, zwitterionic surfactants, and mixtures thereof. Suitable bleaching agents include, but are not limited to, common inorganic/organic chlorine bleach (e.g., sodium or potassium dichloroisocyanurate dihydrate, sodium hypochlorite, sodium hypochloride), hydrogen-peroxide releasing salt (such as, sodium perborate monohydrate (PB1), sodium perborate tetrahydrate (PB4)), sodium percarbonate, sodium peroxide, and mixtures thereof. Suitable bleach-modifying materials include but are not limited to hydrogen peroxide-source bleach activators (e.g., TAED), bleach catalysts (e.g. transition containing cobalt and manganese). Suitable carriers include, but are not limited to: water, low molecular weight organic solvents (e.g., primary alcohols, secondary alcohols, monohydric alcohols, polyols, and mixtures thereof), and mixtures thereof.

Suitable acids include, but are not limited to, acetic acid, aspartic acid, benzoic acid, boric acid, bromic acid, citric acid, formic acid, gluconic acid, glutamic acid, hydrochloric acid, lactic acid, malic acid, nitric acid, sulfamic acid, sulfuric acid, tartaric acid, and mixtures thereof. Suitable corrosion inhibitors, include, but are not limited to, soluble metal salts, insoluble metal salts, and mixtures thereof. Suitable metal salts include, but are not limited to, aluminum, zinc (e.g., hydrozincite), magnesium, calcium, lanthanum, tin, gallium, strontium, titanium, and mixtures thereof. Suitable aesthetic agents include, but are not limited to, opacifiers, dyes, pigments, color speckles, beads, brighteners, and mixtures thereof.

With the addition of suitable adjuncts, the cleaning formulations described herein can be useful as automatic dishwashing detergent ('ADD') compositions (e.g., builders, surfactants, enzymes, etc.), light-duty liquid dishwashing compositions, laundry compositions such as, compact and heavy-duty detergents (e.g., builders, surfactants, enzymes, etc.), rinse aid compositions (e.g., acids, nonionic low-foaming surfactants, carriers, etc.), and/or hard surface cleaning compositions (e.g., zwitterionic surfactants, germicides, etc.). Cleaning formulations according to the present invention include both phosphate and zero-phosphate formulations.

Suitable adjunct ingredients are disclosed in one or more of the following: U.S. Pat. Nos. 2,798,053; 2,954,347; 2,954, 347; 3,308,067; 3,314,891; 3,455,839; 3,629,121; 3,723,322; 3,803,285; 3,929,107, 3,929,678; 3,933,672; 4,133,779; 4,141,841; 4,228,042; 4,239,660; 4,260,529; 4,265,779; 4,374,035; 4,379,080; 4,412,934; 4,483,779; 4,483,780; 4,536,314; 4,539,130; 4,565,647; 4,597,898; 4,606,838; 4,634,551; 4,652,392; 4,671,891; 4,681,592; 4,681,695; 4,681,704; 4,686,063; 4,702,857; 4,968,451; 5,332,528; 5,415,807; 5,435,935; 5,478,503; 5,500,154; 5,565,145; 5,670,475; 5,942,485; 5,952,278; 5,990,065; 6,004,922; 6,008,181; 6,020,303; 6,022,844; 6,069,122; 6,060,299; 6,060,443; 6,093,856; 6,130,194; 6,136,769; 6,143,707; 6,150,322; 6,153,577; 6,194,362; 6,221,825; 6,365,561; 6,372,708; 6,482,994; 6,528,477; 6,573,234; 6,589,926; 6,627,590; 6,645,925; and 6,656,900; International Publication Nos. 00/23548; 00/23549; 00/47708; 01/32816; 01/42408; 91/06637; 92/06162; 93/19038; 93/19146; 94/09099; 95/10591; 95/26393; 98/35002; 98/35003; 98/35004; 98/35005; 98/35006; 99/02663; 99/05082; 99/05084; 99/05241; 99/05242; 99/05243; 99/05244; 99/07656; 99/20726; and 99/27083; European Patent No. 130756; British Publication No. 1137741 A; CHEMTECH, pp. 30-33 (March 1993); J. AMERICAN CHEMICAL SOC., 115, 10083-10090 (1993); and Kirk Othmer ENCYCLOPEDIA OF CHEMICAL TECHNOLOGY, 3rd Ed., Vol. 7, pp. 430-447 (John Wiley & Sons, Inc., 1979).

In one embodiment, cleaning formulations according to the present invention can include from 0% to about 99.99% by weight of the formulation of a suitable adjunct ingredient. In another aspect, the cleaning formulations can include from about 0.01% to about 95% by weight of the formulation of a suitable adjunct ingredient. In other various aspects, the cleaning formulations can include from about 0.01% to about 90%, or from about 0.01% to about 80%, or from about 0.01% to about 70%, or from about 0.01% to about 60%, or from about 0.01% to about 50%, or from about 0.01% to about 40%, or from about 0.01% to about 30%, or from about 0.01% to about 20%, or from about 0.01% to about 10%, or from about 0.01% to about 5%, or from about 0.01% to about 4%, or from about 0.01% to about 3%, or from about 0.01% to about 2%, or from about 0.01% to about 1%, or from about 0.01% to about 0.5%, or alternatively from about 0.01% to about 0.1%, by weight of the formulation of a suitable adjunct ingredient.

Cleaning formulations can be provided in any suitable physical form. Examples of such forms include solids, granules, powders, liquids, pastes, creams, gels, liquid gels, and combinations thereof. Cleaning formulations used herein include unitized doses in any of a variety of forms, such as tablets, multi-phase tablets, gel packs, capsules, multi-compartment capsules, water-soluble pouches or multi-compartment pouches. Cleaning formulations can be dispensed from any suitable device. Suitable devices include, but are not limited to, wipes, hand mittens, boxes, baskets, bottles (e.g., pourable bottles, pump assisted bottles, squeeze bottles), multi-compartment bottles, jars, paste dispensers, and combinations thereof.

In the case of additive or multi-component products contained in single- and/or multi-compartment pouches, capsules, or bottles, it is not required that the adjunct ingredients or cleaning formulations be in the same physical form. In one non-limiting embodiment, cleaning formulations can be provided in a multi-compartment, water-soluble pouch comprising both solid and liquid or gel components in unit dose form. The use of different forms can allow for controlled release (e.g., delayed, sustained, triggered or slow release) of the cleaning formulation during treatment of a surface (e.g., during one or more wash and/or rinse cycles in an automatic dishwashing machine).

The pH of these formulations can range from 1 to 14 when the formulation is diluted to a 1% solution. Most formulations are neutral or basic, meaning in the pH range of 7 to about 13.5. However, certain formulations can be acidic, meaning a pH range from 1 to about 6.5.

Copolymers according to the present invention can also be used in a wide variety of cleaning formulations containing phosphate-based builders. These formulations can be in the form of a powder, liquid or unit doses such as tablets or capsules, and can be used to clean a variety of substrates such as clothes, dishes, and hard surfaces such as bathroom and kitchen surfaces. The formulations can also be used to clean surfaces in industrial and institutional cleaning applications.

In cleaning formulations, the polymer can be diluted in the wash liquor to end use level. The polymers are typically dosed at 0.01 to 1000 ppm in the aqueous wash solutions.

Optional components in detergent formulations include, but are not limited to, ion exchangers, alkalies, anticorrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components can comprise up to about 90% by weight of the detergent formulation.

The polymers of this invention can be incorporated into hand dish, autodish and hard to surface cleaning formulations. The polymers can also be incorporated into rinse aid formulations used in autodish formulations. Autodish formulations can contain builders such as phosphates and carbonates, bleaches and bleach activators, and silicates. These polymers can also be used in reduced phosphate formulations (i.e., less than 1500 ppm in the wash) and zero phosphate autodish formulations. In zero-phosphate autodish formulations, removal of the phosphates negatively affects cleaning, as phosphates provide sequestration and calcium carbonate inhibition. Graft copolymers according to the present invention aid in sequestration and threshold inhibition, and therefore are suitable for use in zero-phosphate autodish formulations.

The above formulations can also include other ingredients such as enzymes, buffers, perfumes, anti-foam agents, processing aids, and so forth. Hard surface cleaning formulations can contain other adjunct ingredients and carriers. Examples of adjunct ingredients include, without limitation, buffers, builders, chelants, filler salts, dispersants, enzymes, enzyme boosters, perfumes, thickeners, clays, solvents, surfactants and mixtures thereof.

One skilled in the art will recognize that the amount of polymer(s) required depends upon the cleaning formulation and the benefit they provide to the formulation. In one aspect, use levels can be about 0.01 weight % to about 10 weight % of the cleaning formulation. In another embodiment, use levels can range from about 0.1 weight % to about 2 weight % of the cleaning formulation.

Water Treatment Systems—

A common problem in industrial water treatment is waterborne deposits, commonly known as foulants. Foulants are loose, porous, insoluble materials suspended in water. They can include such diverse substances as particulate matter scrubbed from the air, migrated corrosion products, silt, clays and sand suspended in the makeup water, organic contaminants (oils), biological matter, and extraneous materials such as leaves, twigs and wood fibers from cooling towers. Fouling can reduce heat transfer by interfering with the flow of cooling water. Additionally, fouling can reduce heat transfer efficiency by plugging heat exchangers. Low molecular weight graft copolymers according to the present invention are excellent dispersants for foulants, and can minimize their deleterious effects in water treatment applications.

Water treatment includes prevention of calcium scales due to precipitation of calcium salts such as calcium carbonate, calcium sulfate and calcium phosphate. These salts are inversely soluble, meaning that their solubility decreases as the temperature increases. For industrial applications where higher temperatures and higher concentrations of salts are present, this usually translates to precipitation occurring at the heat transfer surfaces. The precipitating salts can then deposit onto the surface, resulting in a layer of calcium scale. The calcium scale can lead to heat transfer loss in the system and cause overheating of production processes. This scaling can also promote localized corrosion.

Calcium phosphate, unlike calcium carbonate, is generally not a naturally occurring problem. However, orthophosphates are commonly added to industrial systems (and sometimes to municipal water systems) as a corrosion inhibitor for ferrous metals, typically at levels between 2.0-20.0 mg/L. Therefore, calcium phosphate precipitation can not only result in those scaling problems previously discussed, but can also result in severe corrosion problems as the orthophosphate is removed from solution. As a consequence, industrial cooling systems require periodic maintenance wherein the system must be shut down, cleaned and the water replaced. Lengthening the time between maintenance shutdowns saves costs and is desirable.

One way to lengthen the time between maintenance in a water treatment system is to use polymers that function in either inhibiting formation of calcium salts or in modifying crystal growth. Crystal growth modifying polymers alter the crystal morphology from regular structures (e.g., cubic) to irregular structures such as needlelike or florets. Because of the change in form, crystals that are deposited are easily removed from the surface simply by mechanical agitation resulting from water flowing past the surface. Low molecular weight graft copolymers according to the present invention are particularly useful at inhibiting calcium phosphate based scale formation such as calcium orthophosphate. Further, these inventive copolymers also modify crystal growth of calcium carbonate scale.

It is also advantageous to reuse the water in industrial water treatment systems as much as possible, thereby increasing the time between maintenance. Still, water can be lost over time due to various mechanisms such as evaporation and/or spillage. As a consequence, dissolved and suspended solids tend to become more concentrated over time. Cycles of concentration refers to the number of times solids in a particular volume of water are concentrated. The quality of the water makeup determines how many cycles of concentration can be tolerated. In cooling tower applications where water makeup is hard (i.e., poor quality), 2 to 4 cycles would be considered normal, while 5 and above would represent stressed conditions. Low molecular weight graft copolymers according to the present invention have been found to be effective under stressed conditions.

Copolymers according to the present invention can be added to the aqueous systems neat, or they can be formulated into various water treatment compositions and then added to the aqueous systems. In certain aqueous systems where large volumes of water are continuously treated to maintain low levels of deposited matter, the copolymers can be used at levels as low as 0.5 mg/L. The upper limit on the amount of copolymer used depends upon the particular aqueous system treated. For example, when used to disperse particulate matter, the copolymer can be used at levels ranging from about 0.5 to about 2,000 mg/L. When used to inhibit formation or deposition of mineral scale, the copolymer can be used at levels ranging from about 0.5 to about 100 mg/L. In another embodiment the copolymer can be used at levels from about 3 to about 20 mg/L, and in another embodiment from about 5 to about 10 mg/L.

Once prepared, the low molecular weight graft copolymers can be incorporated into an aqueous treatment composition that includes the graft copolymer and other aqueous treatment chemicals. These other chemicals can include, for example, corrosion inhibitors such as orthophosphates, zinc compounds and tolyltriazole. The amount of inventive copolymer utilized in water treatment compositions can vary based upon the treatment level desired for the particular aqueous system treated. Water treatment compositions generally contain from about 0.001 to about 25% by weight of the low molecular weight graft copolymer. In another aspect, the copolymer is present in an amount of about 0.5% to about 5% by weight of the aqueous treatment composition.

Low molecular weight graft copolymers according to the present invention can be used in any aqueous system wherein stabilization of mineral salts is important, such as in heat transfer devices, boilers, secondary oil recovery wells, automatic dishwashers, and substrates that are washed with hard water. These graft copolymers can stabilize many minerals found in water, including, but not limited to, iron, zinc, phosphonate, and manganese. These copolymers also disperse particulates found in aqueous systems.

Low molecular weight graft copolymers according to the present invention can be used to inhibit scales, stabilize minerals and disperse particulates in many types of processes. Examples of such processes include sugar mill anti-scalant, soil conditioning, treatment of water for use in industrial processes such as mining, oilfields, pulp and paper production, and other similar processes, waste water treatment, ground water remediation, water purification by processes such as reverse osmosis and desalination, air-washer systems, corrosion inhibition, boiler water treatment, as a biodispersant, and chemical cleaning of scale and corrosion deposits. One skilled in the art can conceive of many other similar applications for which the low molecular weight graft copolymer could be useful.

Oilfield Application—

Scale formation is a major problem in oilfield applications. Subterranean oil recovery operations can involve the injection of an aqueous solution into the oil formation to help move the oil through the formation and to maintain the pressure in the reservoir as fluids are being removed. The injected water, either surface water (lake or river) or seawater (for operations offshore) can contain soluble salts such as sulfates and carbonates. These salts tend to be incompatible with ions already present in the oil-containing reservoir (formation water). The formation water can contain high concentrations of certain ions that are encountered at much lower levels in normal surface water, such as strontium, barium, zinc and calcium. As conditions affecting solubility, such as temperature and pressure, change within the producing well bores and topsides, partially soluble inorganic salts such as barium sulfate and calcium carbonate often precipitate from the production water. This is especially prevalent when incompatible waters are encountered such as formation water, seawater, or produced water.

Barium sulfate or other inorganic supersaturated salts such as strontium sulfate can precipitate onto the formation forming scale, thereby clogging the formation and restricting the recovery of oil from the reservoir. These salts can form very hard, insoluble scales that are difficult to prevent. The insoluble salts can also precipitate onto production tubing surfaces and associated extraction equipment, limiting productivity, production efficiency and compromising safety. Certain oil-containing formation waters are known to contain high barium concentrations of 400 ppm and higher. Since barium sulfate forms a particularly insoluble salt, the solubility of which declines rapidly with increasing temperature, it is difficult to inhibit scale formation and to prevent plugging of the oil formation and topside processes and safety equipment.

Dissolution of sulfate scales is difficult, requiring high pH, long contact times, heat and circulation, and therefore is typically performed topside. Alternatively, milling and, in some cases, high-pressure water washing can be used. These are expensive, invasive procedures and require process shutdown. Use of low molecular weight graft copolymers according to the present invention can minimize these sulfate scales, especially downhole.

There is much pressure on the oil field industry to use biodegradable materials. This is especially true in the North Sea. Biodegradability in oil field applications is typically measured by OECD 306b testing, which is conducted in sea water. If the test sample is found to be greater than 60% biodegradable in 28 days, it is termed to be 'readily biodegradable', and if it is found to be greater than 20% biodegradable in 28 days, it is termed to be 'inherently biodegradable'. Graft copolymers typically derive their biodegradable profile from their hydroxyl-containing natural moiety. Therefore, graft copolymers according to the present invention can have at least about 20% by weight of hydroxyl-containing natural moiety, based on total weight of the graft copolymer. In another aspect, the graft copolymers have at least about 60% by weight. In order to be useful in oil field applications, performance of these graft copolymers should be similar to that of their synthetic counterparts, even with these high levels of hydroxyl-containing natural moieties.

Graft copolymers according to the present invention can be used in a number of oil field applications such as cementing, drilling mud, general dispersancy and spacer fluid applications. These applications are described in some detail below.

Water encountered in the oilfield can be very brackish. Often, the water encountered in oilfield applications is sea water or brines from the formation. Hence, useful polymers should be soluble in a variety of brines and brackish waters. Brines can be sea water containing, for example, about 3.5% by weight or more NaCl. Severe brines can contain, for example, up to 3.5% by weight KCl, up to 25% by weight NaCl, and/or up to 20% by weight $CaCl_2$. Therefore, in order to be useful, polymers should be soluble in these systems for them to be effective, for example, as scale inhibitors. Typically, the higher the solubility of the graft copolymer in the brine, the higher its compatibility will be.

One system frequently encountered in the oilfield is sea water. In one embodiment, graft copolymers according to the present invention are soluble at about 5 to about 1000 ppm levels in sea water. In another aspect these graft copolymers are soluble up to about 10,000 ppm levels. In even another aspect these graft copolymers are soluble up to about 100,000 ppm levels.

In one embodiment graft copolymers according to the present invention are soluble at about 5 to about 1000 ppm levels in moderate calcium brine. In one aspect they are soluble up to about 10,000 ppm levels. In even another aspect they are soluble up to about 100,000 ppm levels.

In another embodiment graft copolymers according to the present invention are soluble at about 5 to about 1000 ppm levels in severe calcium brine. In one aspect they are soluble up to about 10,000 ppm levels. In another aspect they are soluble up to about 100,000 ppm levels.

A number of synthetic anionic polymers are not brine compatible. In contrast, graft copolymers according to the present invention are extremely brine compatible. Without limiting the present invention, it is believed that this is because the hydroxyl-containing natural moiety adds non-ionic character to the graft copolymers, thereby enhancing their compatibility in these brine systems. Graft copolymers according to the present invention can have at least about 20% by weight of the hydroxyl-containing natural moiety, based on total weight of the graft copolymer. In another aspect, the copolymer can have at least about 60% by weight of the hydroxyl-containing natural moiety, based on total weight of the copolymer, for brine compatibility.

Typically, the lower the pH of the system, the better is the brine compatibility of the copolymer in that system. However, in most end use conditions the pH of the system is 5 and higher.

In one embodiment, for a given level of hydroxyl-containing natural moiety a minimum amount of maleic acid moiety may be required to obtain brine compatibility. When the synthetic component is a mixture of acrylic acid and maleic acid, the maleic acid constituent can be at least about 10 mole % of the synthetic component. In another aspect the maleic acid constituent is at least about 20 mole % of the synthetic component.

Compositions of synthetic seawater, moderate and severe calcium brines, which are typical brines encountered in the oilfield, are listed in Table 1 below.

TABLE 1

Typical brines encountered in the oilfield
Brine Compositions

| Brine number and description | grams per liter | | | ppm | | |
|---|---|---|---|---|---|---|
| | NaCl | $CaCl_2 \cdot 2H_2O$ | $MgCl_2 \cdot 6H_2O$ | Na | Ca | Mg |
| 1 Synthetic seawater | 24.074 | 1.61 | 11.436 | 9471 | 439 | 1368 |
| 2 Moderate calcium brine | 63.53 | 9.19 | | 24992 | 2506 | 0 |
| 3 Severe calcium brine | 127.05 | 91.875 | | 49981 | 25053 | 0 |

As described in Table 1, sea water contains around 35 grams per liter of a mixture of salts. Moderate and severe calcium brines contain around 70 and 200 grams per liter of a mixture is of salts, respectively.

Cementing of Oil Wells—

A variety of procedures involving hydraulic cement compositions are utilized in the construction and repair of wells such as oil, gas and water wells. For example, in the completion of a well after a well bore has been drilled into one or more subterranean producing formations, a pipe such as casing is disposed in the well bore and a hydraulic cement composition is pumped into the annular space between the walls of the well bore and the exterior of the pipe. The cement composition is allowed to set in the annular space whereby an annular cement sheath is formed therein which bonds the pipe to the walls of the well bore and prevents the undesirable flow of fluids into and through the annular space.

In repairing productive wells, hydraulic cement compositions are often utilized to plug holes or cracks in the pipe disposed in the well bore. These compositions can be also used to plug holes, cracks, voids or channels in the aforementioned cement sheath between the pipe and the well bore, as well as to plug permeable zones or fractures in subterranean formations and the like. These holes or cracks are repaired by forcing hydraulic cement compositions thereinto, which then harden and form impermeable plugs.

High temperatures are frequently encountered in deep subterranean zones to be cemented. The combination of the depth of the zone and the high temperature thereof often require the setting time of the cement composition to be extended to allow the cement composition pumped into the zone to be cemented. Set retarding additives have been developed and used for this purpose, and such additives can be mixed with well cement compositions in amounts sufficient to delay the setting of the compositions until they can be pumped into desired subterranean locations.

Graft copolymers according to the present invention may be used as dispersants, set retarding, fluid loss or gas migration prevention additives in these cementing applications. In one aspect the graft copolymers are made from anionic monomers containing carboxylic acid or phosphonic acid groups. Additionally, non-ionic monomers may be used to improve or enhance performance.

Set retarded hydraulic cement compositions of this invention include hydraulic cement, sufficient water to form a slurry of the cement, and a copolymer set-retarding additive as described above. Various hydraulic cements can be utilized in the cement compositions, for example, Portland cement, and can be, for example, one or more of the various types identified as API Classes A-H and J cements. These cements are classified and defined in API Specification for Materials and Testing for Well Cements, API Specification 10A, 21st Edition dated Sep. 1, 1991, of the American. Petroleum Institute, Washington, D.C. API Portland cement generally has a maximum particle size of about 90 microns and a specific surface (sometimes referred to as Blaine Fineness) of about 3900 square centimeters per gram. One embodiment of a cement slurry base for use in accordance with this invention includes API Class H Portland cement mixed with water to provide a density of from about 11.3 to about 18.0 pounds per gallon.

In one embodiment of the present invention, fine particle size hydraulic cement is utilized. Such cement can include, for example, particles having diameters no larger than about 30 microns ('µm') and Blaine Fineness no less than about 6000 square centimeters per gram. In another aspect, the fine cement particles have diameters no larger than about 17 µm. In even another aspect, the particles are no larger than about 11 µm. In one aspect the Blaine Fineness is greater than about 7000 square centimeters per gram. In another aspect the Blaine Fineness is greater than about 10,000 square centimeters per gram. In even another aspect it is greater than about 13,000 square centimeters per gram. Methods of utilizing such fine particle size hydraulic cement in well completion and remedial operations are disclosed, for example, in U.S. Pat. Nos. 5,121,795 and 5,125,455.

Water used in cement compositions of this invention can be water from any source provided that it does not contain an excess of compounds which adversely react with or otherwise affect other components in the cement compositions. Water is present in a cement composition of this invention in an amount sufficient to form a slurry of the cement, such as a slurry that is readily pumpable. Generally, water is present in an amount of from about 30% to about 60% by weight of dry cement in the composition when the cement is of normal particle size. When a cement of fine particle size as described above is used, water is present in the cement composition in an amount of from about 100% to about 200% by weight of dry cement in the composition. A dispersing agent such as one described in U.S. Pat. No. 4,557,763 is generally included to facilitate formation of the cement slurry and prevent the premature gelation thereof.

Graft copolymers according to the present invention can be included in cement compositions in amounts sufficient to delay or retard setting of the compositions for time periods required to place the compositions in desired locations. When the cement compositions are utilized to carry out completion, remedial and other cementing operations in subterranean zones penetrated by well bores, the compositions must remain pumpable for periods of time long enough to place them in the subterranean zones to be cemented. Thickening and set times of cement compositions can be dependent upon temperature. To obtain optimum results in well applications, a quantity of a copolymer set retarding additive according to the present invention is included in the cement composition so as to provide the necessary pumping time at the temperature encountered downhole. Such quantity can be determined in advance by performing thickening time tests of the type described in the above mentioned API Specification 10A.

Generally, an aqueous solution containing a set retarding copolymer of this invention which is about 40% active is combined with a cement slurry. The copolymer is present in the resulting set retarded cement composition in an amount of from about 0.01% to about 5.0% by weight of dry cement in the composition.

In addition to set retarding additives, a variety of other additives are often included in well cement compositions. Such other additives are well known to those skilled in the art and are added to well cement compositions to vary composition density, increase or decrease strength, control fluid loss, reduce viscosity, increase resistance to corrosive fluids, and the like. A cement composition meeting the specifications of the American Petroleum Institute is mixed with water and other additives to provide a cement slurry appropriate for the conditions existing in each individual well to be cemented.

The methods of this invention for cementing a subterranean zone penetrated by a well bore are basically comprised of the steps of forming a pumpable set retarded cement composition of this invention, pumping the cement composition into the subterranean zone by way of the well bore, and then allowing the cement composition to set therein.

Spacer Fluid Compositions—

While drilling oil and gas wells, a drilling fluid is circulated through the string of drill pipe, through the drill bit and upwardly to the earth's surface through the annulus formed between the drill pipe and the surface of the well bore, thereby cooling the drill bit, lubricating the drill string and removing cuttings from the well bore. When the desired drilling depth of the well is reached, another "performance" fluid such as slurry containing a cement composition is pumped into the annular space between the walls of the well bore and pipe string or casing. In this process, known as "primary cementing," the cement composition sets in the annulus, supporting and positioning the casing, and forming a substantially impermeable barrier or cement sheath that isolates the casing from subterranean zones.

A spacer fluid is a fluid used to displace a performance fluid such as a drilling fluid in a well bore before introduction into the well bore of another performance fluid, such as a cement slurry. Spacer fluids are often used in oil and gas wells to facilitate improved displacement efficiency when pumping new fluids into the well bore. Spacer fluids are also used to enhance solids removal during drilling operations, to enhance displacement efficiency and to physically separate chemically incompatible fluids. For instance, in primary cementing, the cement slurry is separated from the drilling fluid and partially dehydrated gelled drilling fluid may be removed from the walls of the well bore by a spacer fluid pumped between the drilling fluid and the cement slurry. Spacer fluids may also be placed between different drilling fluids during drilling fluid change outs or between a drilling fluid and a completion brine.

The present invention provides improved spacer fluids that can be interposed between the drilling fluid in the wellbore and either a cement slurry or a drilling fluid which has been converted to a cementitious slurry. The spacer fluid serves as a buffer between the drilling fluid and the cement slurry, as well as a flushing agent for evacuating the drilling fluid from the wellbore, thereby resulting in improved displacement efficiency of the drilling fluid removal and improved bonding of the cementitious slurry to surfaces in the wellbore such as the casing or drillpipe wall surfaces.

The spacer fluid of the present invention comprises a graft copolymer dispersant and one or more additional components selected from surfactants, viscosifiers and weighting materials to form a rheologically compatible fluid between the drilling fluid and the cementitious slurry.

The present invention also provides a method of using the spacer fluid. In this method, a spacer fluid having a graft copolymer dispersant is introduced into the wellbore, and a completion fluid, such as cement slurry, is introduced to displace the spacer fluid.

Drilling Fluids—

Any fluids used in a well bore during drilling operations may be termed a drilling fluids. The term is generally restricted to those fluids that are circulated in the bore hole in rotary drilling. The rotary system of drilling requires the circulation of a drilling fluid in order to remove the drilled cuttings from the bottom of the hole and thus keep the bit and the bottom of the hole clean. Drilling fluids are usually pumped from the surface down through a hollow drill pipe to the bit and the bottom of the hole and returned to the surface through the annular space outside the drill pipe. Any caving from the formations already drilled and exposed in the bore hole must be raised to the surface together with the drill cuttings by mud circulation. The casings and larger drill cuttings are separated from the mud at the surface by flowing the mud through a moving screen of a shale shaker and then settling in mud pits.

The flowing drilling fluid cools the bit and the bottom of the hole. The mud usually offers some degree of lubrication between the drill pipe and the wall of the hole. Flows of oil, gas and brines into the well bore are commonly prevented by overbalancing or exceeding formation pressures with the hydrostatic pressure of the mud column.

One function of drilling mud is the maintenance and preservation of the hole already drilled. The drilling fluid should permit identification of drill cuttings and identification of any shows of oil or gas in the cuttings. It should also allow for the use of the desired logging materials and other well completion practices. Finally, the drilling fluid should not impair the permeability of any oil or gas bearing formations penetrated by the well.

Most drilling fluids are drilling mud, which are suspensions of solids in liquids or in liquid emulsions. The densities of such systems are adjusted to between about 7 and about 21 lbs/gal, or about 0.85 to about 2.5 specific gravity. Where water is used as the liquid phase, the lower limit of the density is about 8.6 to about 9 lbs/gal. In addition to density, other important properties of such suspensions may be adjusted to within suitable limits. Filtration quality may be controlled by having a portion of the solids consist of particles of such small size and nature that very little of the liquid phase will escape through the filter cake of solids formed around the bore hole. Control over viscosity and gel forming character of such suspensions is achieved within limits by the amount and kind of solids in the suspension and by the use of chemicals for reducing the internal resistance of such suspensions so that they will flow easily and smoothly. The vast majority of drilling mud is suspension of clays and other solids in water, and is referred to as water based mud. Oil based mud is suspensions of solids in oil. High flash point diesel oils are commonly used in the liquids phase and the finely dispersed solid is obtained by adding oxidized asphalt. Common weighting agents are used to increase the density. Viscosity and thixotropic properties are controlled by surfactants and other chemicals. Oil based mud is used for special purposes such as preventing the caving of certain shale, as well as completion mud for drilling into sensitive sands that would be damaged by water.

Water based mud includes a liquid phase, water and emulsion, a colloidal phase (e.g., clays), an inert phase (e.g., barite weight material and fine sand), and a chemical phase consisting of ions and substances in solution, which influence and control the behavior of colloidal materials such as clays.

Colloidal materials produce higher viscosities in a mud for removing cuttings and caving from the hole and for suspending the inert materials such as finely ground barite. An example of one such material is bentonite, which is a rock deposit. The desirable material in the rock is montmorllionite. In addition to yielding viscosity and suspending weight material, these clays produce mud that has low filtration loss. Special clays are used in mud saturated with salt water (e.g., attapulgite). Starch and sodium carboxymethyl cellulose are used as auxiliary colloids for supplementing the mud properties produced by the clays.

Inert solids in drilling mud include silica, quartz and other inert mineral grains. These inert materials are finely ground weight material and lost circulation material. A commonly used weight material is barite, which has a specific gravity of 4.3. Barite is a soft mineral and therefore minimizes abrasion on the pump valves and cylinders. It is insoluble and relatively inexpensive and therefore is widely used. Lost circulation materials are added to the mud when losses of whole mud occur in crevices or cracks in exposed rocks in the well bore. Commonly used loss circulation materials include shredded cellophane flakes, mica flakes, cane fibers, wood fibers, ground walnut shells and perlite.

The chemical phase of water based mud controls the colloidal phase particularly in the case of bentonite type clays. The chemical phase includes soluble salts which enter the mud from the drill cuttings and the disintegrated portions of the hole and those present in the make up water added to the mud. The chemical phase also includes soluble treating chemicals for reducing viscosity and gel strength of the mud. These chemicals include inorganic materials such as caustic soda, lime, bicarbonate of soda and soda ash. Phosphates such as sodium tetraphosphate may be used to reduce mud viscosities and gel strengths.

In addition to clays and barite, the mud system contains calcium sulfate, a fluid loss reducing agent such as sodium carboxymethyl cellulose, and suitable surfactants. Surfactants include a primary surfactant for controlling the theological properties (viscosity and gelation) of the mud, a defoamer and an emulsifier.

Perforation of earthen formations in order to tap subterranean deposits such as gas or oil is accomplished by well drilling tools and a drilling fluid. These rotary drilling systems consist of a drilling bit fitted with appropriate 'teeth', a set of pipes assembled rigidly together end to end, wherein the diameter of the piping is smaller than that of the drilling bit. This whole rigid piece of equipment—drill bit and drill pipe string—is driven into rotation from a platform situated above the well. As the drill bit attacks and goes through the geological strata, the crushed mineral materials must be cleared away from the bottom of the hole to enable the drilling operation to continue. Aqueous clay dispersion drilling fluids are recirculated down through the hollow pipe, across the face of the drill bit, and upward through the hole.

The drilling fluid cools and lubricates the drill bit, raises the drilling cuttings to the surface of the ground, and seals the sides of the well to prevent loss of water and drilling fluids into the formation through which the drill hole is being bored. After each passage through the well, the mud is passed through a settling tank or trough where sand and drill cuttings are separated, with or without screening. The fluid is then pumped again into the drill pipe by a mud pump.

Some of the most serious problems encountered in producing and maintaining effective clay-based aqueous drilling fluids are due to the interaction of the mud with the earth formation being drilled. These interactions include contamination of the mud by formation fluids, incorporation into the mud of viscosity producing and inert drilled solids, chemical contamination by drilled solids, as well as infiltration of seawater and/or fresh water. The conditions of high temperature and pressure inherent with deeper and deeper drilling operations together with formation interactions make drilling fluid behavior unreliable and difficult to reproduce. Characteristics of an ideal drilling fluid would then include the following:

i) To have rheological characteristics as desirable as possible to be able to transport the mineral cuttings set in dispersion.
ii) To allow the separation of cuttings by all known means as soon as the mud flows out of the hole.
iii) To have such required density as to exert sufficient pressure on the drilled geological formations.
iv) To retain its fundamental rheological qualities as it is submitted, in very deep drilling, to higher and higher temperatures.

Scale Inhibition—

Copolymers according to the present invention can be used for scale inhibition where the scale inhibited is, for example, calcium carbonate, halite, calcium sulfate, barium sulfate, strontium sulfate, iron sulfide, lead sulfide and zinc sulfide and mixtures thereof. Halite is the mineral form of sodium chloride, commonly known as rock salt.

In most applications, including water treatment and oil field scale inhibition, the copolymers can have greater than 80% inhibition to be effective under practical end use conditions. In one aspect, the copolymers can have greater than 90% inhibition. The amount of copolymer needed to perform at this level depends on the scale to be inhibited. For example, calcium carbonate inhibitors can be dosed at less than about 50 ppm. In one aspect, calcium carbonate inhibitors can be dosed at less than about 20 ppm. In even another aspect, calcium carbonate inhibitors can be dosed at less than about 10 ppm. Barium sulfate inhibitors can be dosed at, for example, less than about 100 ppm. In one aspect, barium sulfate inhibitors can be dosed at less than about 20 ppm. In even another aspect, barium sulfate inhibitors can be dosed at less than about 10 ppm. It is also a major advantage to have the same polymer inhibit more than one type of scale, such as combination of calcium carbonate and barium sulfate, or calcium carbonate and calcium phosphate, at less than about 100 ppm, or, in another aspect, less than 50 ppm. Copolymers of this invention can have to a number average molecular weight of less than 100,000. In another aspect, they can have a number average molecular weight of less than 10,000, and, in even another aspect, less than 5,000.

In the oil field scale inhibitors are used in production wells to stop scaling in the reservoir rock formation matrix and/or in the production lines downhole and at the surface. Scaling not only causes a restriction in pore size in the reservoir rock formation matrix (also known as 'formation damage'), thereby reducing the rate of oil and/or gas production, but also blockage of tubular and pipe equipment during surface processing.

In one aspect of the present invention there is provided a method of inhibiting scaling in an aqueous system. This is accomplished by adding a graft copolymer according to the present invention to the aqueous system. The scale inhibitor can be injected, squeezed (as described later on), or added topside to the produced water. The invention is also directed towards a mixture of the graft copolymer and a carrier fluid. Examples of carrier fluid include water, glycol, alcohol or oil. In one aspect the carrier fluid is water, brines or methanol. Methanol is often used to prevent formation of water methane ice structures downhole. In another embodiment of this invention, the graft copolymers of this invention are soluble in methanol. Thus the scale inhibiting polymers can be introduced into the well bore in the methanol line. This is particularly advantageous when there is fixed number of lines that run into the wellbore, thereby eliminating the need for another line. Graft copolymers of this invention can have at least about 10% by weight saccharide functionality, based on total weight of the copolymer, to be soluble in methanol. In another aspect the graft copolymers have at least about 20% by weight saccharide functionality.

Examples of aqueous systems include cooling water systems, water flood systems, to and produced water systems. The aqueous environment may also be in crude oil systems or gas systems, and may be deployed downhole, topside, pipeline or during refining. The aqueous system may include $CO_2$, $H_2S$, $O_2$, brine, condensed water, crude oil, gas condensate, or any combination of the said or other species. Copolymers of this invention may be deployed continuously or intermittently in a batch-wise manner into the aqueous system.

In a preferred embodiment copolymers according to the present invention are added topside and/or in a squeeze treatment. In the latter (also called a "shut-in" treatment) the scale inhibitor is injected into the production well, usually under pressure, "squeezed" into the formation, and held there. In the squeeze procedure the scale inhibitor is injected several feet radially into the production well, where it is retained by adsorption and/or formation of a sparingly soluble precipitate. The inhibitor slowly leaches into the produced water over a period of time and protects the well from scale deposition. The "shut-in" treatment needs to be done regularly (e.g., one or more times a year) if high production rates are to be maintained. The treatment constitutes the "down time" when no production takes place. Copolymers of this invention are particularly good for this type of squeeze scale inhibition due to their saccharide functionality, which can be absorbed onto the formation and released over time.

In order to further describe the additives, compositions and methods of this invention and to facilitate a clear understanding thereof, Examples are provided herein below.

Dispersant for Particulates—

Polymers according to the present invention can be used as a dispersant for minerals in applications such as paper coatings, paints and other coating applications. These particulates are found in a variety of applications, including but not limited to, paints, coatings, plastics, rubbers, filtration products, cosmetics, food and paper coatings. Examples of minerals that can be dispersed by the inventive polymers include titanium dioxide, kaolin clays, modified kaolin clays, calcium carbonates and synthetic calcium carbonates, iron oxides, carbon black, talc, mica, silica, silicates, and aluminum oxide. Typically, the more hydrophobic the mineral the better polymers according to the present invention perform in dispersing particulates.

Fiberglass Sizing—

In yet even another application, the low molecular weight graft copolymer can be used as a binder for fiberglass. Fiberglass insulation products are generally formed by bonding glass fibers together with a synthetic polymeric binder. Fiberglass is usually sized with phenol-formaldehyde resins or polyacrylic acid based resins. The former has the disadvantage of releasing formaldehyde during end use. The polyacrylic acid resin system has become uneconomical due to rising crude oil prices. Hence, there is a need for renewal sizing materials in this industry. The low molecular weight graft polymers of this invention are a good fit for this application. They can be used by themselves or in conjunction with the with the phenol formaldehyde or polyacrylic acid binder system.

The binder composition is generally applied by means of a suitable spray applicator to a fiber glass mat as it is being formed or soon after it is formed and while it is still hot. The spray applicator aids in distributing the binder solution evenly throughout the formed fiberglass mat. The polymeric binder solution tends to accumulate at the junctions where fibers cross each other, thereby holding the fibers together at these junctions. Solids are typically present in the aqueous solution in amounts of about 5 to 25 percent by weight of total solution. The binder can also be applied by other means known in the art, including, but not limited to, airless spray, air spray, padding, saturating, and roll coating.

Residual heat from the fibers volatizes water away from the binder. The resultant high-solids binder-coated fiberglass mat is allowed to expand vertically due to the resiliency of the glass fibers. The fiberglass mat is then heated to cure the binder. Typically, curing ovens operate at a temperature of from 130° C. to 325° C. However, the binder composition of the present invention can be cured at lower temperatures of from about 110° C. to about 150° C. In one aspect, the binder composition can be cured at about 120° C. The fiberglass mat is typically cured from about 5 seconds to about 15 minutes. In one aspect the fiberglass mat is cured from about 30 seconds to about 3 minutes. The cure temperature and cure time also depend on both the temperature and level of catalyst used. The fiberglass mat can then be compressed for shipping. An important property of the fiberglass mat is that it returns substantially to its full vertical height once the compression is removed. The low molecular weight graft polymer based binder produces a flexible film that allows the fiberglass insulation to bounce back after a roll is unwrapped for use in walls/ceilings.

Fiberglass or other non-wovens treated with the copolymer binder composition is useful as insulation for heat or sound in the form of rolls or batts; as a reinforcing mat for roofing and flooring products, ceiling tiles, flooring tiles, as a microglass-based substrate for printed circuit boards and battery separators; for filter stock and tape stock and for reinforcements in both non-cementatious and cementatious masonry coatings.

Process for Producing Low Color Graft Copolymers—

The present invention provides a process for making graft copolymers at a lighter color. The graft copolymers are made using a redox system of a metal ion and hydrogen peroxide. In another aspect, the graft copolymers are made using free radical initiating systems such as eerie ammonium nitrate and Fe (II)/$H_2O_2$ (see, Würzburg, O. B., MODIFIED STARCHES: PROPERTIES AND USES, *Grafted Starches*, Chpt. 10, pp. 149-72, CRC Press, Boca Raton (1986)). Fe (II) can be substituted with other metal ions such as Cu (II), Co (III), Mn (III) and others. Of these ions, Cu (II) appears to be the most effective and gives low molecular weight products.

The amount of metal ions required depends on the metal ion used, the amount of $H_2O_2$ used, the monomers to be grafted and the relative amount of natural component to synthetic monomer. To produce low molecular weight graft copolymers, the amount of metal ion needed can exceed 10, and in some cases 100, ppm based on moles of monomer, which is much higher than the 1 to 2 ppm typically used. The amount of metal ion can be given in terms of ppm as moles of the metal ion per total moles of monomer. For example, in the case of Fe (II), 10 ppm or greater moles of Fe based on moles of monomers can be used. In another aspect, 100 ppm or greater moles of Fe based on moles of monomers can be used. For Cu (II), 1 ppm or greater moles of Cu based on moles of monomers can be used. In another aspect, 10 ppm or greater moles of Cu based on moles of monomers can be used. In even another aspect, 100 ppm or greater moles of Cu based on moles of monomers can be used. Higher amounts of metal ion are needed when lower amount of $H_2O_2$ are used. In addition, higher levels of the metal ion are needed when the amount of the natural component is high, for example, about 50 weight percent or greater of the total weight of natural component and synthetic monomer. The Cu (II) system is more effective than Fe (II) to systems at lowering molecular weight (see, e.g., Examples 2 and 3).

As a result of the amount of metal ion used, polymer solutions produced can be extremely dark in color. Color is measured using a Gardner scale. This scale has a series of standards and the color of the test solution is determined by comparing against these standards. The scale goes from 1 to 18, wherein 1 is a very light, almost water white, solution and 18 is an extremely dark tar color solution. For certain applications like detergents, a dark color polymer is aesthetically unattractive to the end user. Therefore, a dark color polymer solution or dry powder is unacceptable. A color of 13 or above on the Gardner scale is considered unacceptable for certain applications such as detergents.

According to the process of the present invention, low molecular weight graft copolymers are produced having a Gardner color of 12 or less. Normally, polymerization is carried out at acidic pH, and Fe(II) and hydrogen peroxide are typically used as the initiating system. However, in the present inventive process copper salts can be used instead of iron to produce lower color materials. Also, lower feed times are used to produce products with low color. For example, comonomers like acrylic acid are fed in over a period of 5 to 6 hours to react with the sluggish maleic acid. Lowering the feed times to 3 to 4 hours and using Cu (II) salts such as copper sulfate lowers the color. Finally, in the present process polymerization occurs at low pH. In one aspect, polymerization occurs at a pH of about 6 or below. In another aspect, polymerization occurs at a pH of about 5 or below. In even another aspect, polymerization occurs at a pH of about 3 or below.

Monomers such as maleic acid are sluggish in polymerization reactions. They need a certain amount of neutralization to react. They are typically added to the initial charge and neutralized at the same time. This leads to very dark colored materials. It is better to add the maleic in the initial charge. However, the maleic should not be completely neutralized in the initial charge. Caustic needs to be added slowly during the reaction so that the polymerization reaction is carried out under acidic pH conditions. Part of the neutralization agent may be added to the initial charge and the rest may be added in a feed. Alternatively, the maleic acid may be co-fed along with the neutralizing agent such as NaOH. Also, most of the products are neutralized at the end of the reaction. They need to be neutralized to below 6 to maintain a low color.

Other methods of producing low molecular weight graft copolymers involve reacting monomers at high temperatures. Typically, the higher the temperature is, the lower the resultant molecular weight. Reaction temperature ranges at ambient pressure can be about 40° C. to 130° C. In another aspect, the temperature range is 80° C. to 100° C. Higher temperatures can be used when the reaction (which is usually in an aqueous medium) occurs at pressures above ambient.

EXAMPLES

The following examples are intended to exemplify the present invention but are not intended to limit the scope of the invention in any way. The breadth and scope of the invention are to be limited solely by the claims appended hereto.

Molecular weights of all the graft copolymers in the Examples below were determined by aqueous Gel Permeation Chromatography ('GPC') using a series of polyacrylic acid standards. The method uses 0.05M sodium phosphate (0.025M $NaH_2PO_4$ and 0.025M $Na_2HPO_4$) buffered at pH 7/0 with $NaN_3$ as the mobile phase. The columns used in this method are: TSKgel PWx1 Guard column, TSKgel; G6000PWx1, G4000PWx1, G3000PWx1, G2500PWx1 set at a temperature of 32° C. Flow rate is 1 mL per minute, and the injection volume is 450 µL. The instrument is calibrated using five different polyacrylic acids standards injected at five different concentrations: PAA1K (2.0 mg/mL), PAA5K (1.75 mg/mL), PAA85K (1.25 mg/mL), PAA495K (0.75 mg/mL), and PAA1700K (0.2 mg/mL), all from American Polymer Standards Corporation.

Molecular weight of starting polysaccharides in the Examples below was determined by aqueous Gel Permeation Chromatography (GPC) using a series of hydroxylethyl starch standards. The method uses 0.05M sodium phosphate (0.025M $NaH_2PO_4$ and 0.025M $Na_2HPO_4$) buffered at pH 7/0 with $NaN_3$ as the mobile phase. The columns used in this method are: TSKgel PWx1 Guard column, TSKgel; G6000PWx1, G4000PWx1, G3000PWx1, and G2500PWx1 set at a temperature of 32° C. The flow rate is 1 mL/min and injection volume is 450 µL. The instrument is calibrated using five different hydroxyethyl starch standards injected at five different concentrations: HETA10K (2.0 mg/mL), HETA17K (1.75 mg/mL), HETA40K (1.25 mg/mL), HETA95K (0.75 mg/mL), and HETA205K (0.2 mg/mL), all from American Polymer Standards Corporation.

Comparative Example 1

Synthesis of copolymer using grafting recipe adapted from Example 1 of U.S. Pat. No. 5,227,446 but Limited to only Acrylic Acid as the Synthetic Component, with the Molar Ratio of Fe and Peroxide kept the Same—

A reactor containing 140 grams of water, 65 grams of maltodextrin (Cargill MD™ 01960 dextrin, having a DE of 11 and a number average molecular weight of 14,851 as determined by aqueous GPC described above) and 0.00075 grams of ferrous ammonium sulfate hexahydrate ('FAS') (the level of FAS used in the '446 patent when the moles of monomer used in that example are accounted for, or 0.0019 mmoles FAS and 4 ppm as moles of Fe based on moles of acrylic acid monomer) was heated to 98° C. A solution containing 35 grams of acrylic acid (0.486 moles) in 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 159,587 as determined by aqueous GPC process noted above.

Comparative Example 2

Synthesis of copolymer using grafting recipe adapted from Example 2 of U.S. Pat. No. 5,227,446—

263.1 g of water, 80 g of maltodextrin (Cargill MD™ 01960, soluble component 90%, DE value of 11 to 14), 63.8 g of maleic anhydride and 0.00075 grams (3.5 g of a 0.1% strength) aqueous FAS solution and 94 g of 50% strength aqueous sodium hydroxide solution are heated to a boil in a heated reactor equipped with stirrer, reflux condenser, thermometer, feed devices, and nitrogen inlet and outlet. The degree of neutralization of maleic acid produced from the maleic anhydride in aqueous solution is 90.2%. When the reaction mixture has started boiling, a solution of 178.2 g of acrylic acid in 141.9 g of water is added over the course of 5 hours, and a solution of 16.6 g of 50% strength hydrogen peroxide in 44.4 g of water is added at a constant rate over the course of 6 hours at the boil. When the addition of acrylic acid is complete, the degree of neutralization of the maleic acid and acrylic acid units present in the polymer is 31.1%. When the addition of hydrogen peroxide is complete, the reaction mixture is heated at the boil for a further 1 hour, neutralized to a pH of 7.2 by adding 180 g of 50% strength aqueous sodium hydroxide solution and cooled.

Comparative Example 3

Synthesis of copolymer using grafting recipe adapted from Example 11 of U.S. Pat. No. 5,227,446—

192 g of water, 146 g of corn starch, 16 g of maleic anhydride and 0.38 g of phosphorus acid are heated to 98° C. in a heated reactor. The reaction product formed a gel ball after 15 minutes. Heating was continued but the gel did not break. This indicates that the starch needs to be degraded and water soluble before the grafting reaction can occur.

Comparative Example 4

140 grams of water, 75 grams of maltodextrin (Cargill MD™ 01925 dextrin, having a DE of 25 and a number average molecular weight of 10,867 as determined by aqueous GPC described above) and 0.00075 grams of FAS were heated in a reactor to 98° C. A solution containing 25 grams of acrylic acid in 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 8 by adding 25 grams of a 50% solution of NaOH. The final product was a clear water white solution having a Gardner color of 1. The number average molecular weight of this polymer was 56,066 as determined by aqueous GPC process noted above.

Comparative Example 5

140 grams of water, 65 grams of maltodextrin (Cargill MD™ 01960 dextrin, having a DE of 11 and a number average molecular weight of 14,851 as determined by aqueous GPC described above) and 0.00075 grams of FAS were heated in a reactor to 98° C. A solution containing 35 grams of acrylic acid in 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 101,340 as determined by aqueous GPC process noted above.

Comparative Example 6

Slow Addition of FAS 140 grams of water, 65 grams of maltodextrin (Cargill MD™ 01960 dextrin, having a DE of 11 and a number average molecular weight of 14,851 as determined by aqueous GPC described above) were heated in a reactor to 98° C. A solution containing 35 grams of acrylic acid in 30 grams of water and 0.00075 grams of ferrous ammonium sulfate hexahydrate ('FAS') was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 101,340 as determined by aqueous GPC process noted above.

Comparative Example 7

140 grams of water, 65 grams of maltodextrin (Cargill MD™ 01918 dextrin, having a DE of 18 and a number average molecular weight of 12,937 as determined by aqueous GPC described above) and 0.00075 grams of FAS were heated in a reactor to 98° C. A solution containing 35 grams of acrylic acid in 30 grams of water was added to the reactor over a period of 45 minutes. An initiator solution comprising 3.6 grams of 35% hydrogen peroxide to solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 125,980 as determined by aqueous GPC process noted above.

Comparative Example 8

Increased Level of FAS 140 grams of water, 65 grams of maltodextrin (Cargill MD™ 01960 dextrin, having a DE of 11 and a number average molecular weight of 14,851 as determined by aqueous GPC described above) and 0.0014 grams of FAS were heated in a reactor to 98° C. A solution containing 35 grams of acrylic acid in 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 88,450 as determined by aqueous GPC process noted above.

Comparative Example 9

Increased Level of FAS 140 grams of water, 65 grams of maltodextrin (Cargill MD™ 01960 dextrin, having a DE of 11 and a number average molecular weight of 14,851 as determined by aqueous GPC described above) and 0.002 grams of FAS were heated in a reactor to 98° C. A solution containing 35 grams of acrylic acid in 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized to a pH of 5 by adding 18 grams of a 50% solution of NaOH. The final product was a clear water white solution having a Gardner color of 1. The number average molecular weight of this polymer was 83,062 as determined by aqueous GPC process noted above.

Example 1

Low molecular weight copolymer according to the present invention using increased level of fas to produce the lower molecular weight polymer.

The copolymer in Comparative Example 2 above was reproduced in the same manner with the exception that instead of 0.00075 grams of FAS, 0.075 grams of FAS was used (100 times the level of FAS used in Comparative Example 1, or 0.19 mmoles of FAS and 400 ppm as moles of Fe based on moles of acrylic acid monomer). The final product was a dark amber solution having a Gardner color of 12. The number average molecular weight of this polymer was 5,265 as determined by aqueous GPC. This example illustrates that higher levels of Fe(II) (400 ppm instead of 4) are required to lower the molecular weight compared to Comparative Example 1. However, this leads to darker colored materials as evidenced by the significant jump in Gardner color from 1 to 12.

Example 2

Low molecular weight copolymer according to the present invention using increased level of fas to produce the lower molecular weight polymer The copolymer in Comparative Example 1 above was reproduced in the same manner with the exception that instead of 0.00075 grams of FAS, 0.75 grams of FAS was used (1,000 times the level of FAS used in Comparative Example 1, or 1.9 mmoles FAS and 4000 ppm as moles of Fe based on moles of acrylic acid monomer). The final product was a very dark amber solution having a Gardner color of 18. The number average molecular weight of this polymer was 5,380 as determined by aqueous GPC. (This Mn is within experimental error and may indicate a limit of how low a Mn can be reached with increasing levels of Fe.)

Example 3

Low molecular weight copolymer according to the present invention using Cu (II) sulfate pentahydrate instead of fas to produce the copolymer The copolymer in Comparative Example 1 above was reproduced in the same manner to with the exception that instead of 0.00075 grams of FAS, 0.048 grams of Cu (II) sulfate pentahydrate was used (0.19 mmoles Cu (II) sulfate pentahydrate and 400 ppm as moles of Cu based on moles of acrylic acid monomer, or the same amount of Cu used as Fe used in Example 1). The final product was a clear yellow solution having a Gardner color of 9. The number average molecular weight of this polymer was 3,205 as determined by aqueous GPC. This shows that using Cu instead of Fe produces a lower molecular weight copolymer. Moreover, an acceptable yellow color (Gardner 9 instead of 12), which is much lighter than the dark amber color of Example 1, is obtained by using the Cu salt instead of Fe and neutralizing to a pH of about 5.

Example 4

Low molecular weight copolymer according to the present invention using Cu (II) sulfate pentahydrate instead of fas to produce the copolymer The copolymer in Comparative Example 2 above was reproduced in the same manner with the exception that instead of 0.00075 grams of FAS, 0.0022 grams of Cu (11) sulfate pentahydrate was used (0.0088 mmoles Cu (H) sulfate pentahydrate, which is the same molar level as the FAS used in Comparative Example 2). The final product was a dark amber solution having a Gardner color of 11. The number average molecular weight of this polymer was 4,865 as determined by aqueous GPC. This shows that using Cu instead of Fe produces a lower molecular weight copolymer.

Example 5

Low molecular weight and color acrylic acid-maleic acid graft copolymer using Cu (II) as a catalyst and shorter feed times to produce the copolymer A reactor containing 263.1 grams of water 63.8 grams of maleic anhydride (0.65 moles) and 80 grams of maltodextrin (Cargill MD™ 01960, having a DE of 11 and Mn of 14, 851) and 0.0022 grams of Copper (II) sulfate pentahydrate (0.0088 mmoles or 2.8 ppm as moles of Cu based on moles of maleic and acrylic acid, or the same molar level as the FAS used in Comparative Example 2) was heated to 98° C. A solution containing 178.2 grams of acrylic acid (2.47 moles) and 141.9 grams of water was added to the reactor over a period of 2.5 hours. An initiator solution comprising 23.7 grams of 35% hydrogen peroxide solution in 37.3 grams of deionized water was simultaneously added to the reactor over a period of 3 hours. The reaction product was held at 98° C. for an additional hour. The polymer was then neutralized by adding 180 grams of a 50% solution of NaOH. The final product was a clear light amber solution having a Gardner color of 4. The number average molecular weight of this polymer was 5,323 as determined by aqueous GPC.

Example 6

Low molecular weight acrylic acid-maleic acid graft copolymer using Cu (II) as a catalyst and higher amounts of natural material to synthetic monomer A reactor containing 400 grams of water 100 grams of maleic anhydride (1.02 moles) and 240 grams of maltodextrin (Cargill MD™ 01960, having a DE of 11 and Mn of 14,851) and 0.022 grams of Copper (II) sulfate pentahydrate (0.088 mmoles, or 30 ppm moles of Cu based on moles of maleic and acrylic acid) was heated to 98° C. A solution containing 140 grams of acrylic acid (1.94 moles) and 141.9 grams of water was added to the reactor over a period of 5 hours. The amount of natural component was 50 weight % of total natural component and synthetic monomers. An initiator solution comprising 75 grams of 35% hydrogen peroxide and 25 grams of sodium persulfate dissolved in 80 grams of deionized water was simultaneously added to the reactor over a period of 6 hours. Simultaneously, 75 grams of 50% NaOH dissolved in 100 grams of water was added over 6 hours and 15 minutes so that the maleic acid is partially neutralized during the polymerization process. The reaction product was held at 98° C. for an additional hour. The polymer was then neutralized by adding 70 grams of a 50% solution of NaOH. The final product was a very dark amber solution with a Gardner color of 17 and a pH of 4.6. The number average molecular weight of this polymer was 1,360 as determined by aqueous GPC. The residual acrylic acid was 546 ppm and the residual maleic acid was 252 ppm.

Example 7

Low molecular weight acrylic acid-maleic acid graft copolymer using Cu (II) as a catalyst and higher amounts of natural material to synthetic monomer A reactor containing 400 grams of water, 100 grams of maleic anhydride (1.02 moles) and 300 grams of 80% solution of Cargill Sweet Satin Maltose and 0.022 grams of Copper (II) sulfate pentahydrate (0.088 mmoles, or 30 ppm as moles of Cu based on moles of maleic and acrylic acid) was heated to 98° C. A solution containing 140 grams of acrylic acid (1.94 moles) and 141.9 grams of water was added to the reactor over a period of 5 hours. The amount of natural component was 50 weight % of total natural component and synthetic monomers. An initiator solution comprising 75 grams of 35% hydrogen peroxide and 25 grams of sodium persulfate dissolved in 80 grams of deionized water was simultaneously added to the reactor over a period of 6 hours. Simultaneously, 75 grams of 50% NaOH dissolved in 100 grams of water was added over 6 hours and 15 minutes partially neutralizing the maleic acid during the polymerization process. The reaction product was held at 98° C. for an additional hour. The polymer was then neutralized by adding 70 grams of a 50% solution of NaOH. The final product was a very dark amber solution having a Gardner color of 18 and a pH of 4.6. The number average molecular weight of this polymer was 1,340 as determined by aqueous GPC. The residual acrylic acid was 588 ppm and the residual maleic acid was 460 ppm.

Example 8

Low molecular low color graft copolymer comprising 75 weight % of the natural component A reactor containing 120 grams of water and 94 grams of Cargill Sweet Satin Maltose (80% solution) and 0.048 grams of Cu(II) sulfate pentahydrate (0.19 mmoles, of 553 ppm as moles of Cu based on moles of acrylic acid monomer) was heated to 98° C. A solution containing 25 grams of acrylic acid (0.347 moles) and 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized by adding 18 grams of a 50% solution of NaOH (0.225 moles) for a 65% neutralization of the acrylic acid groups. The final product was a clear golden yellow solution with a Gardner color of 7 and a pH of 5.1. The number average molecular weight of this polymer was 2,024 as determined by aqueous GPC. The polymer solution was stable for months with no signs of phase separation.

Example 9

Low molecular low color graft copolymer using 85 weight % of the natural component A reactor containing 120 grams of water and 106 grams of Cargill Sweet Satin Maltose (80% solution) and 0.048 grams of Cu(II) sulfate pentahydrate (0.19 mmoles, or 923 ppm as moles of Cu based on the moles of acrylic acid monomer) was heated to 98° C. A solution containing 15 grams of acrylic acid (0.208 moles) and 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized by adding 7.5 grams of a 50% solution of NaOH (0.09 moles) for a 45% neutralization of the acrylic acid groups. The final product was a clear golden yellow solution with a Gardner color of 7 and a pH of 4.9. The number average molecular weight of this polymer was 1,255 as determined by aqueous GPC. The polymer solution was stable for months with no signs of phase separation.

Example 10

Low molecular low color graft copolymer using 95 weight % of the natural component A reactor containing 120 grams of water, 119 grams of Cargill Sweet Satin Maltose (80% solution) and 0.048 grams of Cu(II) sulfate pentahydrate (0.19 mmoles Cu(II) sulfate pentahydrate, or 2736 ppm as moles of Cu based on moles of acrylic acid monomer) was heated to 98° C. A solution containing 5 grams of acrylic acid (0.069 moles) and 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized by adding 2.5 grams of a 50% solution of NaOH (0.031 moles) for a 45% neutralization of the acrylic acid groups. The final product was a clear golden yellow solution having a Gardner color of 7 and a pH of 4.9. The number average molecular weight of this polymer was below the detectable limit of the GPC. The polymer solution was stable for months with no signs of phase separation.

Example 11

Low molecular weight acrylic acid-maleic acid graft copolymer using Cu (II) as a catalyst A reactor containing 500 grams of water, 100 grams of maleic anhydride (1.02 moles) and 300 grams of 80% solution of Cargill Sweet Satin Maltose and 75 grams of 50% NaOH and 0.022 grams of Cu (II) sulfate pentahydrate (0.088 mmoles, or 30 ppm as moles of Cu based on moles of maleic and acrylic acid) was heated to 98° C. A solution containing 140 grams of acrylic acid (1.94 moles) was added to the reactor over a period of 5 hours. The amount of natural component was 50 weight percent of the natural component and the synthetic monomers. An initiator solution comprising 75 grams of 35% hydrogen peroxide and 25 grams of sodium persulfate dissolved in 80 grams of deionized water was simultaneously added to the reactor over a period of 6 hours. The reaction product was held at 98° C. for an additional hour. The polymer was then neutralized by adding 70 grams of a 50% solution of NaOH. The final product was a very dark amber solution with a Gardner color of 15. The number average molecular weight of this polymer was 4,038 as determined by aqueous GPC.

Example 12

Low molecular weight graft copolymer

A reactor containing a mixture of 50 grams of maleic anhydride dissolved in 250 grams of water and neutralized with 37.5 grams of a 50% solution of NaOH was heated to 98° C. 150 grams of Cargill Sweet Satin Maltose (65% solution) and 0.011 grams of $CuSO_4.5H_2O$ was added to the mixture. A monomer solution containing 70 grams of acrylic acid was subsequently added to the reactor over a period of 3 hours and 45 minutes. An initiator solution comprising of 12.5 grams of sodium persulfate and 37.5 grams of a 35% solution of hydrogen peroxide dissolved in 40 grams of water was added to the reactor at the same time as the monomer solution but over a period of 4 hours. The reaction product was held at 98° C. for an additional hour. The final product was a clear light amber solution and had 39% solids.

Example 13

Low molecular weight graft copolymer 47 grams of maleic anhydride was dissolved in 172 grams of water and neutralized with 22.5 grams of a 50% solution of NaOH. The mixture was heated to 95° C. and 39.4 grams of DE 11 (Cargill MD™ 01960) dextrin, spray-dried maltodextrin obtained by enzymatic conversion of common corn starch, available from Cargill Inc., Cedar Rapids, Iowa) and 0.02 grams of ferrous ammonium sulfate hexahydrate were added. A monomer solution containing 70 grams of acrylic acid was subsequently added to the reactor over a period of 4 hours. An initiator solution comprising of 4.7 grams of sodium persulfate and 38.7 grams of a 35% solution of hydrogen peroxide dissolved in 12.7 grams of water was added to the reactor at the same time and over the same period as the monomer solution. The reaction product was held at 95° C. for 30 minutes. 0.3 grams of erythorbic acid dissolved in 0.6 grams of water and 4 grams of a 41% bisulfite solution were simultaneously added to scavenge the residual monomer. The final product was a clear light amber solution and had 44% solids.

Example 14

Low molecular weight graft copolymer 47.3 grams of maleic anhydride was dissolved in 172.6 grams of water and neutralized with 22.5 grams of a 50% solution of NaOH. The mixture was heated to 95 C and 39.4 grams of DE 11(Cargill MD™ 01960) dextrin, spray-dried maltodextrin obtained by enzymatic conversion of common corn starch, available from Cargill Inc., Cedar Rapids, Iowa) and 0.02 grams of ferrous ammonium sulfate hexahydrate was added. A monomer solution containing 70.9 grams of acrylic acid was subsequently added to the reactor over a period of 4 hours. An initiator solution comprising of 4.8 grams of sodium persulfate and 38.7 grams of a 35% solution of hydrogen peroxide dissolved in 12.7 grams of water was added to the reactor over a period of 5.5 hours. The reaction product was held at 95° C. for 30 minutes. 0.3 grams of erythorbic acid dissolved in 0.6 grams of water and simultaneously, 4 grams of a 41% bisulfite solution was added to scavenge the residual monomer. The final product was a clear light amber solution and had 35% solids. The number average molecular weight of this polymer as measured by aqueous GPC was 1755.

Example 15

Low molecular weight graft copolymer 22 grams of maleic anhydride was dissolved in 172.6 grams of water and neutralized with 22.5 grams of a 50% solution of NaOH. The mixture was heated to 95 C and 102.4 grams of DE 11(Cargill MD™ 01960 dextrin, spray-dried maltodextrin obtained by enzymatic conversion of common corn starch, available from Cargill Inc., Cedar Rapids, Iowa) and 0.01 grams of ferrous ammonium sulfate hexahydrate was added. A monomer solution containing 33 grams of acrylic acid was subsequently added to the reactor over a period of 5 hours. An initiator solution comprising of 2.4 grams of sodium persulfate and 19.4 grams of a 35% solution of hydrogen peroxide dissolved in 12.7 grams of water was added to the reactor over a period of 5.5 hours. The reaction product was held at 95° C. for 30 minutes. 0.3 grams of erythorbic acid dissolved in 0.6 grams of water and simultaneously, 4 grams of a 41% bisulfite solution was added to scavenge the residual monomer. The final product was a clear light amber solution and had 44% solids. The number average molecular weight of this polymer as measured by aqueous GPC was 1280.

Example 16

Test for Anti-Redeposition

Copolymers from the above Examples were tested for anti-redeposition properties in a generic powdered detergent formulation. The powdered detergent formulation was as follows:

Economy Quality Powdered Detergent Formulation

| Ingredient | % active |
| --- | --- |
| BioSoft D-40 | 5 |
| Neodol 25-7 | 5 |
| Soda Ash | 46 |

-continued

| Ingredient | % active |
|---|---|
| Sodium Silicate | 3 |
| Sodium Sulfate | 40 |

The test was conducted in a full scale washing machine using 3 cotton and 3 polyester/cotton swatches. Soil consisting of 17.5 g rose clay, 17.5 g bandy black clay and 6.9 g oil blend (75:25 vegetable/mineral) was used. The test was conducted for 3 cycles using 100 g powder detergent per wash load. The polymers were dosed in at 1.0 wt % of the detergent. The wash conditions used were temperature of 33.9° C. (93° F.), 150 ppm hardness and a 10 minute wash cycle.

L (luminance), a (color component) and b (color component) values before the first cycle and after the third cycle was measured as $L_1$, $a_1$, $b_1$ and $L_2$, $a_2$, $b_2$, respectively, using a spectrophotometer. Delta whiteness index is calculated using the L, a, b values above.

TABLE 2

Economy Formula Results

| | | Delta Whiteness Index [1] | |
|---|---|---|---|
| Polymer | Mn | Cotton | Poly/cotton |
| Blank (no polymer) | | 11.5 | 11.4 |
| Alcospserse 602N [2] | 2000 | 3.12 | 2.65 |
| Example 1 | 5265 | 2.7 | 1.7 |
| Example 2 | 5380 | 3.3 | 4.2 |
| Example 3 | 3205 | 4.1 | 2.9 |
| Comparative Example 1 | 159,587 | 12.58 | 10.25 |
| Comparative Example 4 | 56,066 | 7.67 | 7.90 |
| Comparative Example 5 | 101,340 | 13.93 | 9.70 |
| Comparative Example 6 | 142,998 | 11.58 | 8.09 |
| Comparative Example 7 | 125,980 | 9.67 | 6.99 |
| Comparative Example 8 | 88,450 | 12.39 | 9.75 |
| Comparative Example 9 | 83,062 | 12.81 | 9.81 |

[1] Lower Delta values indicate better anti-redeposition performance.
[2] Sodium salt of polyacrylic acid, available from Alco Chemical, Chattanooga, Tennessee.

The above data indicates that low molecular weight graft copolymers according to the present invention are far superior to higher molecular weight graft copolymers in anti-redeposition and dispersancy, and are comparable to an industry standard synthetic polymer (here, Alcosperse 602N).

Examples 17 to 19

Granular Powder Laundry Detergent Formulations

TABLE 3

Powdered Detergent Formulations

| Ingredient | Example 17 Wt % | Example 18 Wt % | Example 19 Wt % |
|---|---|---|---|
| Anionic surfactant | 22 | 20 | 10.6 |
| Non-ionic surfactant | 1.5 | 1.1 | 9.4 |
| Cationic surfactant | — | 0.7 | — |
| Zeolite | 28 | — | 24 |
| Phosphate | — | 25 | — |
| Silicate | | | 8.5 |
| Sodium carbonate/bicarbonate | 27 | 14 | 9 |
| Sulfate | 5.4 | 15 | 11 |
| Sodium silicate | 0.6 | 10 | — |
| Polyamine | 4.3 | 1.9 | 5 |
| Brighteners | 0.2 | 0.2 | — |
| Sodium perborate | | 1 | |
| Sodium percarbonate | 1 | — | — |
| Sodium hypochlorite | | | 1 |
| Suds suppressor | 0.5 | 0.5 | — |
| Bleach catalyst | 0.5 | — | |
| Polymer of Example 1 | 1 | | |
| Polymer of Example 2 | | 5 | |
| Polymer of Example 3 | | | 2 |
| Water and others | Balance | Balance | Balance |

Example 20

Hard Surface Cleaning Formulations

Acid Cleaner

| Ingredient | wt % |
|---|---|
| Citric acid (50% solution) | 12.0 |
| Phosphoric acid | 1.0 |
| $C_{12}$-$C_{15}$ linear alcohol ethoxylate with 3 moles of EO | 5.0 |
| Alkyl benzene sulfonic acid | 3.0 |
| Polymer of Example 1 | 1.0 |
| Water | 78.0 |

Alkaline Cleaner

| Ingredient | wt % |
|---|---|
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of Example 3 | 1.0 |

Example 21

Automatic Dishwash Powder Formulation

| Ingredients | wt % |
|---|---|
| Sodium tripolyphosphate | 25.0 |
| Sodium carbonate | 25.0 |
| C12-15 linear alcohol ethoxylate with 7 moles of EO | 3.0 |
| Polymer of Example 2 | 4.0 |
| Sodium sulfate | 43.0 |

Example 22

Automatic Non-Phosphate Dishwash Powder Formulation

| Ingredients | wt % |
| --- | --- |
| Sodium citrate | 30 |
| Polymer of Example 1 | 10 |
| Sodium disilicate | 10 |
| Perborate monohydrate | 6 |
| Tetra-acetyl ethylene diamine | 2 |
| Enzymes | 2 |
| Sodium sulfate | 30 |

Example 23

Handwash Fabric Detergent

| Ingredients | wt % |
| --- | --- |
| Linear alkyl benzene sulfonate | 15-30 |
| Nonionic surfactant | 0-3 |
| Na tripolyphosphate (STPP) | 3-20 |
| Na silicate | 5-10 |
| Na sulfate | 20-50 |
| Bentonite clay/calcite | 0-15 |
| Polymer of Example 3 | 1-10 |
| Water | Balance |

Example 24

Fabric Detergent with Softener

| Ingredients | wt % |
| --- | --- |
| Linear alkylbenzene sulfonate | 2 |
| Alcohol ethoxylate | 4 |
| STPP | 23 |
| Polymer of Example 1 | 1 |
| Na carbonate | 5 |
| Perborate tetrahydrate | 12 |
| Montmorillonite clay | 16 |
| Na sulfate | 20 |
| Perfume, FWA, enzymes, water | Balance |

Example 25

Bar/Paste for Laundering

| Ingredients | wt % |
| --- | --- |
| Linear alkylbenzene sulfonate | 15-30 |
| Na silicate | 2-5 |
| STPP | 2-10 |
| Polymer of Example 1 | 2-10 |
| Na carbonate | 5-10 |
| Calcite | 0-20 |
| Urea | 0-2 |
| Glycerol | 0-2 |
| Kaolin | 0-15 |
| Na sulfate | 5-20 |
| Perfume, FWA, enzymes, water | Balance |

Example 26

Liquid Detergent Formulation

| Ingredients | wt % |
| --- | --- |
| Linear alkyl benzene sulfonate | 10 |
| Alkyl sulfate | 4 |
| Alcohol ($C_{12}$-$C_{15}$) ethoxylate | 12 |
| Fatty acid | 10 |
| Oleic acid | 4 |
| Citric acid | 1 |
| NaOH | 3.4 |
| Propanediol | 1.5 |
| Ethanol | 5 |
| Polymer of Example 11 | 1 |
| Ethanol oxidase | 5 u/ml |
| Water, perfume, minors | up to 100 |

Example 27

Water Treatment Compositions

Once prepared, water-soluble polymers are incorporated into a water treatment composition that includes the water-soluble polymer and other water treatment chemicals. Other water treatment chemicals include corrosion inhibitors such as orthophosphates, zinc compounds and tolyl triazole. The level of inventive polymer utilized in water treatment compositions is determined by the treatment level desired for the particular aqueous system treated. Water soluble polymers generally comprise from 10 to 25 percent by weight of the water treatment composition. Conventional water treatment compositions are known to those skilled in the art, and exemplary water treatment compositions are set forth in the four formulations below. These compositions containing the polymer of the present invention have application in, for example, the oil field.

| Formulation 1 |
| --- |
| 11.3% of Polymer of Ex. 1 |
| 47.7% Water |
| 4.2% HEDP |
| 10.3% NaOH |
| 24.5% Sodium Molybdate |
| 2.0% Tolyl triazole |
| pH 13.0 |
| Formulation 2 |
| 11.3% Polymer of Ex. 3 |
| 59.6% Water |
| 4.2% HEDP |
| 18.4% TKPP |
| 7.2% NaOH |
| 2.0% Tolyl triazole |
| pH 12.64 |

-continued

Formulation 3

22.6% of Polymer of Ex. 2
51.1% Water
8.3% HEDP
14.0% NaOH
4.0% Tolyl triazole
pH 12.5

Formulation 4

11.3% Polymer of Ex. 1
59.0% Water
4.2% HEDP
19.3% NaOH
2.0% Tolyl triazole
4.2% $ZnCl_2$
pH 13.2 where HEDP is 1-hydroxyethylidene-1,1 diphosphonic acid and TKPP is tri-potassium polyphosphate.

Example 28

Test for Anti-Redeposition

The polymers in Example 4 and Comparative Example 2 were tested for anti-redeposition performance. The data below indicates that the polymer of Example 4 was far superior to that of Comparative Example 2 in anti-redeposition properties. Further, the performance of polymer 4 proved superior to a commercial synthetic Na polyacrylate (Alcosperse 602N), which is an industry standard for this application.

One wash anti-redeposition data using commercial Sun liquid detergent. The test protocol is described in Example 4. Lower Delta WI (whiteness index) numbers are better. The data indicate that the low molecular weight graft copolymer of Example 4 produced using the Cu catalyst has superior anti-redeposition properties compared to the graft copolymer of Comparative Example 2 using the same amount of Fe. In fact, Comparative Example 2 polymer performs similar to the control, which does not have any polymer. However, the low molecular weight graft copolymer of this invention performs similar to the industry standard synthetic polyacrylic acid.

Example 29

Low molecular weight maleic acid graft copolymer using Cu (II) as a catalyst and higher amounts of natural material to synthetic monomer A reactor containing a mixture of 450 grams of water, 100 grams of maleic anhydride (1.02 moles), 300 grams of 80% solution of Cargill Sweet Satin Maltose, 0.0022 grams of Cu(II) sulfate pentahydrate and 75 grams of a 50% solution of NaOH was heated to 98° C. A solution containing 140 grams of acrylic acid (1.94 moles) in 50 grams of water was added to the reactor over a period of 5 hours. The mole percent of maleic in the synthetic part of the copolymer was 34.4. The amount of natural component was 50 weight percent, based on total weight percent of natural component and synthetic monomers. An initiator solution comprising 52 grams of 35% hydrogen peroxide in 80 grams of deionized water was simultaneously added to the reactor over a period of 4 hours. The reaction product was held at 98° C. for an additional hour. The polymer was then neutralized by adding 70 grams of a 50% solution of NaOH. The final product was a clear yellow solution with a Gardner color of 8. The number average molecular weight of this polymer was 1,429 as determined by aqueous GPC.

Example 30

Low molecular weight maleic acid graft copolymer with very high amounts of natural material to synthetic monomer A reactor containing a mixture of 200 grams of water, 8 grams of maleic anhydride (0.08 moles), 160 grams of Cargill maltodextrin MD 1956 (DE 7.5) and 11.8 grams of a 50% solution of NaOH was heated to 98° C. A shot of 0.0018 grams of ferrous ammonium sulfate hexahydrate was added to the reactor just before monomer and initiator feeds were started. A solution containing 22 grams of acrylic acid (0.31 moles) in 71 grams of water was added to the reactor over a period of 150 minutes. The mole percent of maleic in the synthetic part of the copolymer was 21. The amount of natural component was 84.2 weight percent based on total weight percent of natural component and synthetic monomers. An initiator solution comprising 3 grams of 35% hydrogen peroxide in 22 grams of deionized water was simultaneously

TABLE 4

Anti-redeposition Results

| | | Delta WI (Whiteness Index) | | | | |
|---|---|---|---|---|---|---|
| Sample | Description | Cotton Plain weave | Poly/cotton Plain weave | Polyester Double knit | Cotton Interlock | Nylon woven |
| Control | | 6.61 | 5.12 | 11.31 | 12.89 | 3.47 |
| Alcosperse 602N | synthetic Na polyacrylate | 4.05 | 3.53 | 5.71 | 8.31 | 1.62 |
| AL 602N (repeat) | synthetic Na polyacrylate | 3.75 | 3.20 | 3.56 | 8.84 | 1.11 |
| Example 4 | Example 2 of U.S. Pat. No. 5,227,446 repeated using Cu(II), (Mn 4865) | 2.61 | 2.92 | 2.67 | 7.62 | 1.41 |
| Comparative Example 2 | Example 2 of U.S. Pat. No. 5,227,446 using Fe(II) | 4.34 | 4.50 | 8.62 | 14.54 | 4.12 | added to the reactor over a period of 180 minutes. The reaction product was held at 98° C. for an additional hour. The polymer was then neutralized by adding 10 grams of a 50% solution of NaOH. The number average molecular weight of this polymer was 3,970 as determined by aqueous GPC.

Example 31

Calcium Binding/Sequestration

The calcium binding/sequestration properties of a series of polymers were measured using the test procedure below—
Procedural—
Reagent Preparation:
1. Prepare Buffer solution as follows. In a 500 ml flask, dissolve 35 g $NH_4Cl$ in 100 ml of DI water. Use a magnetic stir bar and plate to mix while adding 285 ml of $NH_3$ (strong ammonia solution). Bring to 500 ml volume with DI water.
2. Prepare 0.1M Calcium solution @ pH 10 as follows.
   Weigh 14.69 g of $CaCl_2.2H_2O$ into a 500 ml Erlenmeyer flask.
   Add 200 ml of DI water.
   Adjust pH of solution to 10 with 1N NaOH or 1:1 HCl.
   Pour into 1000 ml volumetric flask, add 50 ml Buffer solution pH 10 and bring to 1000 ml volume with DI water.
3. Prepare 0.05M EDTA solution as follows. Dissolve 18.62 g of EDTA disodium salt dihydrate with DI water in a 1000 ml volumetric flask, bringing the total volume to 1000 ml.
Procedure for determination of Calcium Binding Capacity:
1. Weigh approximately 1 g of polymer sample into beaker. Record the exact weight of sample.
2. Pipette 50 ml DI water into beaker and stir for 5 minutes, using magnetic stir bar and stir plate.
3. Pipette 50 ml of calcium solution pH 10 into beaker and stir for 20.
4. Filter the suspension using the funnel and Whatman 1 filter (filtrate).
5. Pipette 50 ml of the filtrate into a 250 ml Erlenmeyer flask. Add 10 ml of the buffer solution pH 10. Mix with magnetic stirrer, and add three drops of 1% Eriochrome Black T as indicator.
6. Titrate with 0.05M EDTA solution until the violet color turns to blue. Record the amount of titrant used.

Titration for Calculating Calcium Binding Capacity (CBC):
1. A blank titration must be completed to calculate the Calcium Binding Capacity. Into a 250 ml Erlenmeyer flask pipette 50 ml of the calcium solution and 10 ml of the buffer solution. Stir using a magnetic stirrer and add three drops of Eriochrome Black T solution. Titrate with EDTA solution and record the amount necessary to cause the solution to reach a blue color. This figure will be used in the calculation for CBC.

Calculation of CBC:

$$CBC(mgCaCO_3)@pH\ 10 = \frac{(N-2S)(MEDTA)(100.09)}{Sample\ weight}$$

N=EDTA volume used to perform blank titration (ml)
S=EDTA volume used to perform sample titration (ml)
M=EDTA concentration The CBC of various polymers was measured using the procedure described above. Grams of $CaCO_3$ sequestered per mole of COOH in the polymer were calculated using the equations below:

Moles COOH/g polymer=moles of COOH from maleic anhydride portion+moles of COOH from acrylic acid portion Note: each maleic anhydride group contributes 2 COOH moieties.

$$Moles\ COOH/g\ polymer(B) = \frac{2\times(A/100)}{98} + \frac{(100-A)/100}{72}$$

$$gCaCO_3/Mole\ COOH\ in\ polymer = (CBC)/(B)\times 1000$$

TABLE 5

Calcium Sequestration

| Example | (Mw) weight average molecular weight | Wt % of synthetic monomers as a part of the weight of synthetic monomer and natural component in graft copolymer | Mole % maleic anhydride in the synthetic portion of the graft copolymer (A) | Moles COOH/g polymer (B) | Ca sequestration mg $CaCO_3$/g polymer (CBC) | g $CaCO_3$/Mole COOH in polymer |
|---|---|---|---|---|---|---|
| Alcosperse 602N (Commercial synthetic polyacrylic acid) | | 100 | 0 | 0.0138 | 300 | 21.6 |
| Alcosperse 175 (Commercial synthetic acrylic-maleic copolymer) | | 100 | 22 | 0.021 | 450 | 21.2 |
| Example 3 | | 15 | 0 | 0.0021 | 17 | 8.2 |
| Example 11 | 79.834 | 75 | 20.8 | 0.014 | 440 | 38.4 |
| Example 29 | 4,213 | 50 | 34.4 | 0.0058 | 266 | 45.1 |
| Example 30 | 19.961 | 15.8 | 21.0 | 0.0024 | 132 | 54.8 |

Calcium sequestration is a stoichiometric property and is directly proportional to the moles of acid functionality in the polymer. The data indicates that maleic acid containing graft copolymers have much higher calcium sequestration numbers compared to the synthetic copolymers or the acrylic acid grafts on a molar basis.

Example 32

Low molecular weight graft copolymer using an oxidized starch derivative

A reactor containing 140 grams of water, 65 grams of Flomax 8 (oxidized starch having a Mn of 9,891, available from National Starch and Chemical, Bridgewater, N.J.) and 0.00075 grams of FAS was heated to 98° C. A solution containing 35 grams (0.486 moles) of acrylic acid and 30 grams of water was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The polymer was then neutralized by adding 35 grams of a 50% solution of NaOH. The final product was an opaque yellow solution. The number average molecular weight of this polymer was 24,373 as determined by aqueous GPC.

This polymer was tested according to the anti-redeposition test of Example 4. The data indicates that the polymer did not work as well as the synthetic Na polyacrylate. Nevertheless it was far better than the control which did not have any polymer.

TABLE 6

Anti-Redeposition Results

| Polymer | Delta Whiteness Index for Cotton | Delta Whiteness Index for Poly-Cotton |
|---|---|---|
| Control (None) | 10.9 | 13.6 |
| Alcosperse 602N | 4 | 2.9 |
| Example 30 | 5.5 | 6.9 |

Example 33

Inhibition of Precipitation

The efficacy of various treatments was tested for their ability to prevent the precipitation of calcium carbonate in typical cooling water conditions (a property commonly referred to as the threshold inhibition). This test was developed in correlation with the dynamic testing units, in order to allow for an initially quick screening test of scale threshold inhibitors for cooling water treatment. The ratio of calcium concentration to alkalinity is 1.000:1.448 for the chosen water. This ratio is a fairly accurate average of cooling water conditions found worldwide. One should expect that water wherein the alkalinity is proportionately less will be able to reach higher levels of calcium, and that water containing a proportionally greater amount of alkalinity will reach lower levels of calcium. Since cycle of concentration is a general term, one cycle was chosen, in this case, to be that level at which calcium concentrations equaled 100.0 mg/L Ca as $CaCO_3$ (40.0 mg/L as Ca). The complete water conditions at one cycle of concentration (i.e., make-up water conditions) are as follows:

Simulated Make-Up Water Conditions:
100.00 mg/L Ca as $CaCO_3$ (40.0 mg/L as Ca) (one cycle of concentration)
49.20 mg/L Mg as $CaCO_3$ (12.0 mg/L as Mg)
2.88 mg/L Li as $CaCO_3$ (0.4 mg/L Li as Li)
144.80 M Alkalinity (144.0 mg/L as $HCO_3$)
13.40 P Alkalinity (16.0 mg/L as $CO_3$)

In dynamic testing (where the pH is about 8.80, bulk water temperature is around 104° F., flow is approximately 3.0 m/s, and heat transfer is approximately 17,000 BTU/hr/ft$^2$), above average threshold inhibitors can reach anywhere from four to five cycles of concentration with this water before significant calcium carbonate precipitation begins. Average threshold inhibitors may only be able to reach three to four cycles of concentration before precipitating, while below average inhibitors may only reach two to three cycles of concentration before precipitation occurs. Polymer performance is generally expressed as percent calcium inhibition. This number is calculated by taking the actual soluble calcium concentration at any given cycle, dividing it by the intended soluble calcium concentration for that same given cycle, and then multiplying the result by 100. Resulting percentage amounts that are below 90% calcium inhibition are considered to be indicators of a significant precipitation of calcium carbonate. However, there are two ways in which an inhibitor can react once their threshold limit is reached. Some lose practically all of their calcium carbonate threshold inhibition properties, falling from 90-100% to below 25% threshold inhibition. Others are able to "hold on" better to their inhibition properties, maintaining anywhere from 50% to 80% threshold inhibition.

Testing beyond the threshold limit in order to determine each inhibitor's ability to "hold on" has been found to be a better method of predicting an inhibitors ability to prevent the formation of calcium carbonate in the dynamic testing units. It also allows for greater differentiation in test results. Therefore, a higher cycle (4.0 cycles) was chosen for this test. At this concentration, above average inhibitors should be expected to give better than 60% threshold inhibition. Poor inhibitors should be expected to give less than 20% threshold inhibition, while average inhibitors should fall somewhere in between.

Materials:
One incubator/shaker, containing a 125 mL flask platform, with 34 flask capacity
34 Screw-cap Erlenmeyer Flasks (125 mL)
1 Brinkmann Dispensette (100 mL)
Deionized Water
Electronic pipette(s) capable of dispensing between 0.0 mL and 2.5 mL
250 Cycle Hardness Solution*
10,000 mg/L treatment solutions, prepared using known active solids of the desired treatment *
10% and 50% solutions of NaOH
250 Cycle Alkalinity Solution*
0.2 μm syringe filters or 0.2 μm filter membranes
34 Volumetric Flasks (100 mL)
Concentrated Nitric Acid
*See solution preparations in next section.

Solution Preparations:
All chemicals used are reagent grade and weighed on an analytical balance to ±0.0005 g of the indicated value. All solutions are made within thirty days of testing. Once the solutions are over thirty days old, they are remade.

The hardness, alkalinity, and 12% KCl solutions should be prepared in a one liter volumetric flask using DI water. The following amounts of chemical should be used to prepare these solutions—

250 Cycle Hardness Solution:
10,000 mg/L Ca⇒36.6838 g $CaCl_2.2H_2O$
3,000 mg/L Mg⇒25.0836 g $MgCl_2.6H_2O$
100 mg/L Li⇒0.6127 g LiCl
250 Cycle Alkalinity Solution:
36,000 mg/L $HCO_3$⇒48.9863 g $NaHCO_3$
4,000 mg/L $CO_3$⇒7.0659 g $Na_2CO_3$ 10,000 mg/L Treatment Solutions:

Using percentage of active product in the supplied treatment, a 250 mL of a 10,000 mg/L active treatment solution is made up. This was done for every treatment tested. The pH of the solutions was adjusted to between 8.70 and 8.90 using 50% and 10% NaOH solutions by adding the weighed polymer into a specimen cup or beaker and filling with DI water to approximately 90 mL. The pH of this solution was then adjusted to approximately 8.70 by first adding the 50% NaOH solution until the pH reaches 8.00, and then by using the 10% NaOH until the pH equals 8.70. The solution was then poured into a 250 mL volumetric flask. The specimen cup or beaker was rinsed with DI water and this water added to the flask until the final 250 mL is reached. The formula used to calculate the amount of treatment to be weighed is as follows:

$$\text{Grams of treatment needed} = \frac{(10,000 \text{ mg/L})(0.25 \text{ L})}{(\text{decimal \% of active treatment})(1000 \text{ mg})}$$

Test Setup Procedure:

The incubator shaker should be turned on and set for a temperature of 50° C. to preheat. 34 screw cap flasks were set out in groups of three to allow for triplicate testing of each treatment, allowing for testing of eleven different treatments. The one remaining flask was used as an untreated blank. Label each flask with the treatment added.

Calibrate the Brinkmann dispensette to deliver 96.6 mL, using DI water, by placing a specimen cup or beaker on an electronic balance and dispensing the water into the container for weighing. Adjust the dispensette accordingly, until a weight of 96.5-96.7 g DI water is delivered. Record this weight and repeat for a total of three measurements and take the average. Once calibrated, dispense the 96.6 mL DI water into each flask.

Using a 2.5 mL electric pipette, add 1.60 mL of hardness solution to each flask. This is the amount that will achieve four cycles of make-up water.

Using a 250 μL electronic pipette, add 200 μL of desired treatment solution to each flask. This amount will result in a 20 mg/L active treatment dosage. Use a new tip on the electric pipette for each treatment solution so cross contamination does not occur.

Using a 2.5 mL electric pipette, add 1.60 mL of alkalinity solution to each flask. This is the amount that will achieve four cycles of make-up water. The addition of alkalinity should be done while swirling the flask, so as not to generate premature scale formation from high alkalinity concentration pooling at the addition site.

Prepare one "blank" solution in the exact same manor the above treated solutions were prepared, except add DI water in place of the treatment solution.

Place all 34 flasks uncapped onto the shaker platform and close the door. Turn the shaker on at 250 rpm and 50° C. Record the time of entry. The flask should be left in the shaker at these conditions for 17 hours.

Prepare a "total" solution in the exact same manor the above treated solutions were prepared, except add DI water in place of both the treatment solution and alkalinity solution. Cap this solution and let sit overnight outside the shaker.

Test Analysis Procedure:

Once 17 hours have passed, remove the 34 flasks from the shaker and let cool for one hour. Filter each flask solution through a 0.2 μm filter membrane. Analyze this filtrate, directly, for lithium, calcium, and magnesium concentrations by either an Inductively Couple Plasma (ICP) Optical Emission System or Flame Atomic Absorption (AA) system. Also analyze these concentrations in the prepared "total" solution.

Calculations of Results:

Once the lithium, calcium, and magnesium concentrations are known in all 34 shaker to samples and in the "total" solution, the percent inhibition is calculated for each treatment. The lithium is used as a tracer of evaporation in each flask (typically about ten percent of the original volume). The lithium concentration found in the "total" solution is assumed to be the starting concentration in all 34 flasks. The concentrations of lithium in the 34 shaker samples can then each be divided by the lithium concentration found in the "total" sample. These results will provide the multiplying factor for increases in concentration, due to evaporation. The calcium and magnesium concentrations found in the "total" solution are also assumed to be the starting concentrations in all 34 flasks. By multiplying these concentrations by each calculated evaporation factor for each shaker sample, one can determine the final intended calcium and magnesium concentration for each shaker sample. By subtracting the calcium and magnesium concentrations of the "blank" from both the actual and intended concentrations of calcium and magnesium, then dividing the resulting actual concentration by the resulting intended concentration and multiplying by 100, one can calculate the percent inhibition for each treated sample. The triplicate treatments should be averaged to provide more accurate results. A spreadsheet should be set up to make each individual calculation less time consuming.

Example

"Total" concentration analysis results:
Li=1.61 mg/L
Ca=158.0 mg/L
Mg=50.0 mg/L
"Blank" concentration analysis results:
Li=1.78 mg/L
Ca=4.1 mg/L
Mg=49.1 mg/L
Shaker sample concentration analysis results:
Li=1.78 mg/L
Ca=150.0 mg/L
Mg=54.0 mg/L By taking the $L_1$ concentration from the shaker sample and dividing by the $L_1$ concentration in the "total" sample, one will obtain an evaporation factor of—
⇒1.78 mg/L/1.61 mg/L=1.11

By multiplying the Ca and Mg concentrations in the "total" sample by this factor, one can obtain the final intended concentrations of Ca and Mg in the shaker sample—
Ca⇒1.11×158.0 mg/L=175.4 mg/L Ca
Mg⇒1.11×50.0 mg/L=55.5 mg/L Mg Finally, by subtracting the calcium and magnesium concentrations of the "blank" from both the actual and intended concentrations of calcium and magnesium, then dividing the resulting actual concentrations of Ca and Mg in the shaker sample by the resulting final intended concentrations and multiplying by 100, one can calculate the percent threshold inhibition of calcium and magnesium—
Ca⇒((150.0 mg/L−4.1 mg/L)/(175.4 mg/L−4.1 mg/L))× 100=85.2% Ca inhibition
Mg⇒((54.0 mg/L−49.1 mg/L)/(55.5 mg/L−49.1 mg/L))× 100=76.6% Mg inhibition The polymer of Example 3 was tested in this test at 3 cycles of concentration and compared with a commercial polyacrylate (AQUATREAT 900A from Alco Chemical). The data indicate that the low molecular weight graft copolymer was as good a calcium carbonate inhibitor in this test.

TABLE 7

Precipitant Inhibition

| Polymer | % inhibition at 20 ppm | % inhibition at 10 ppm |
| --- | --- | --- |
| Example 3 | 100 | 98 |
| Aquatreat 900A | 100 | 100 |

Low molecular weight sulfonated graft copolymers are exemplified in U.S. Pat. No. 5,580,941. These materials are made using mercaptan chain transfer agents. Mercaptan chain transfer agents lower the molecular weight, but in the process generate synthetic polymers. These mercaptans stop a growing chain Equation 1 and start a new polymer chain Equation 2, illustrated in the mechanism below (Odian, PRINCIPLES OF POLYMERIZATION, $2^{nd}$ Ed., John Wiley & Sons, p. 226, New York (1981)). This new chain is now comprised of ungrafted synthetic copolymers.

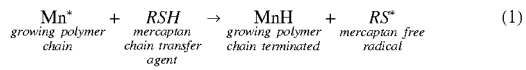

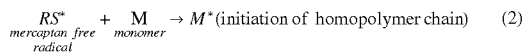

Performance of materials exemplified in U.S. Pat. No. 5,580,941 ('the '941 patent') is mainly due to ungrafted synthetic copolymers generated in this process. This is the reason they exemplify relatively low amounts of saccharide (40 wt % or less). Higher amounts of saccharide will phase separate. Secondly, calcium binding data in Table 4 of the '941 patent is inversely proportional to the amount of saccharide functionality. This indicates that the material is mostly a mixture of synthetic copolymer and saccharide with little to no grafting. The saccharide contribution to Ca binding is negligible.

TABLE 8

'941 Copolymer Calcium Binding

| Polymer of '941 | Ca binding from Table 4 mg CaCO$_3$/g polymer | Wt % saccharide in polymer |
| --- | --- | --- |
| 1 | 1898 | 30 |
| 2 | 990 | 40 |
| 12 | >3000 | 9.7 |

Finally, Comparative Example 5 of the '941 patent forms a precipitate when higher molecular weight saccharide (maltodextrin with DE 20) is used. This illustrates that there is little grafting and the resulting synthetic polymer is phase separating from the maltodextrin. This does not happen with the other examples because disaccharides like sucrose are used, which are small molecules and are compatible.

In contrast to the polymers of the '941 patent, graft copolymers of the present invention can have greater than 50 wt % maltodextrin and are compatible, indicating high degree of grafting.

Example 34

Sulfonated graft copolymer with maltodextrin (without mercaptan chain transfer agent)

A reactor containing 156 grams of water, 49 grams of maltodextrin (Cargill MD™ 01918 maltodextrin, DE of 18) and 0.0039 grams of FAS was heated to 98° C. A solution containing 81.6 grams of acrylic acid and 129.2 of a 50% solution of sodium 2-acrylamido-2-methyl propane sulfonate (AMPS) was added to the reactor over a period of 45 minutes. An initiator solution comprising 13 grams of 35% hydrogen peroxide solution in 78 grams of deionized water was simultaneously added to the reactor over a period of 60 minutes. The reaction product was held at 98° C. for an additional hour. The polymer was then neutralized by adding 27.2 grams of a 50% solution of NaOH. The final product was a clear yellow solution. The number average molecular weight of this polymer was 68,940. This sample remained a clear solution showing no sign of precipitation (phase separation) even after 4 months. In contrast, a blend of Alcosperse 545 (AA-AMPS copolymer) and Cargill MD™ 01918 maltodextrin phase separates within a day. This is similar to the phase separation seen in Comparative Example 5 of the '941 patent where a maltodextrin having a DE of 20 (a lower molecular weight dextrin than that used in our recipe) is used. This clearly indicates that the Example 5 has very little graft copolymer due to the presence of mercaptan, which leads to a lot of synthetic copolymer.

Also, a blend of Alcosperse 545 and saccharose or sucrose is phase stable. This is due to the fact that the latter is a small molecule and is very compatible. This supports our assertion that Examples 1, 2 and 12 of the '941 patent are due to the presence of mercaptans are mostly synthetic copolymers blended with the saccharose. The performance of these polymers in the Table above supports this assertion.

Example 35

CaCO$_3$ inhibition performance

CaCO$_3$ inhibition performance was evaluated according to NACE™ 3076-2001 standardized test with a few modifications. Our modified test used 30 mL total sample size instead of 100 mL indicated in the method. The polymers were tested at 5, 10 and 15 ppm levels. The samples were tested in triplicate rather than duplicate. The samples were heated in heat block rather than oven or water bath and Ca concentration was determined by ICP.

In order to match the sample matrix and dilution for ICP evaluation, the "blank before precipitation" was made by combining 15 mL Ca Brine+15 mL of NaCl Brine plus DI water in place of polymer treatment, and the "blank after precipitation" was made by combining 15 mL Ca Brine+15 mL of Bicarbonate Brine plus DI water instead of polymer.

Samples synthesized above were tested in this modified NACE CaCO$_3$ test. Polymers that give 80% or greater inhibition are generally considered good performers for this application. The data is provided in Table 8 below—

TABLE 9

CaCO₃ % Inhibition

| wt % natural: synthetic (mol %) | % Solids | Mw | Mn | Mw/Mn | Residual (ppm) AA | MA | NACE CaCO₃ (% inhibition) 5 ppm | 10 ppm | 15 ppm |
|---|---|---|---|---|---|---|---|---|---|
| Aquatreat AR-900A [1] | | | | | | | 93.29 | | |
| Example 12 | 50:50 (AA 69%, MA 31%) | 39.01 | 2190 | 1203 | 1.8 | 953 | 2420 | 79.79 | 89.57 | 83.60 |
| Example | 50:50 (AA 69%, MA 31%) | 38.54 | 7842 | 1721 | 4.6 | 502 | 1890 | 86.36 | 88.61 | 84.72 |

[1] Low molecular weight polyacrylic acid available from Alco Chemical, Chattanooga, TN.

Example 36

Synthesis of graft copolymer 47 grams of maleic anhydride was dissolved in 172 grams of water and neutralized with 22.5 grams of a 50% solution of NaOH. The mixture was heated to 95 C and 39.4 grams of DE 11 (Cargill MD™ 01960 dextrin, spray-dried maltodextrin obtained by enzymatic conversion of common corn starch, available from Cargill Inc., Cedar Rapids, Iowa) and 0.02 grams of ferrous ammonium sulfate hexahydrate was added. A monomer solution containing 70 grams of acrylic acid was subsequently added to the reactor over a period of 4 hours. An initiator solution comprising of 4.7 grams of sodium persulfate and 38.7 grams of a 35% solution of hydrogen peroxide dissolved in 12.7 grams of water was added to the reactor at the same time as the monomer solution i.e. over a period of 4 hours. The reaction product was held at 95° C. for 30 minutes. 0.3 grams of erythorbic acid dissolved in 0.6 grams of water and simultaneously, 4 grams of a 41% bisulfite solution was added to scavenge the residual monomer. The final product was a clear light amber solution and had 44% solids.

Example 37

Synthesis of graft copolymer 47.3 grams of maleic anhydride was dissolved in 172.6 grams of water and neutralized with 22.5 grams of a 50% solution of NaOH. The mixture was heated to 95 C and 39.4 grams of DE 11(Cargill MD™ 01960) dextrin, spray-dried maltodextrin obtained by enzymatic conversion of common corn starch, available from Cargill Inc., Cedar Rapids, Iowa) and 0.02 grams of ferrous ammonium sulfate hexahydrate was added. A monomer solution containing 70.9 grams of acrylic acid was subsequently added to the reactor over a period of 4 hours. An initiator solution comprising of 4.8 grams of sodium persulfate and 38.7 grams of a 35% solution of hydrogen peroxide dissolved in 12.7 grams of water was added to the reactor over a period of 5.5 hours. The reaction product was held at 95° C. for 30 minutes. 0.3 grams of erythorbic acid dissolved in 0.6 grams of water and simultaneously, 4 grams of a 41% bisulfite solution was added to scavenge the residual monomer. The final product was a clear light amber solution and had 35% solids. The number average molecular weight of this polymer as measured by aqueous GPC was 1755.

Example 38

22 grams of maleic anhydride was dissolved in 172.6 grams of water and neutralized with 22.5 grams of a 50% solution of NaOH. The mixture was heated to 95 C and 102.4 grams of DE 11(Cargill MD™ 01960 dextrin, spray-dried maltodextrin obtained by enzymatic conversion of common corn starch, available from Cargill Inc., Cedar Rapids, Iowa) and 0.01 grams of ferrous ammonium sulfate hexahydrate was added. A monomer solution containing 33 grams of acrylic acid was subsequently added to the reactor over a period of 5 hours. An initiator solution comprising of 2.4 grams of sodium persulfate and 19.4 grams of a 35% solution of hydrogen peroxide dissolved in 12.7 grams of water was added to the reactor over a period of 5.5 hours. The reaction product was held at 95° C. for 30 minutes. 0.3 grams of erythorbic acid dissolved in 0.6 grams of water and simultaneously, 4 grams of a 41% bisulfite solution was added to scavenge the residual monomer. The final product was a clear light amber solution and had 44% solids. The number average molecular weight of this polymer as measured by aqueous GPC was 1280.

Example 39

The samples above were evaluated for barium sulfate inhibition using the procedure below:
Part 1: Solution Preparation
1. Prepare Synthetic North Sea seawater (SW) brine.
   a. Add the following salts to a glass volumetric flask and bring to volume with DI water. Weigh all +/−0.01 grams.
   b. Buffer SW by adding 1 drop of acetic acid then enough saturated sodium acetate solution to reach pH 6.1. Record amount added.
   c. Filter brine through 0.45 μm membrane filter under vacuum to remove any dust particles that may affect test reproducibility.

TABLE 10

Salt water brine

| | SW | | | |
|---|---|---|---|---|
| | g/L | g/2 L | g/3 L | record actual |
| NaCl | 24.074 | 48.148 | 72.222 | |
| CaCl₂ *2H₂O | 1.57 | 3.14 | 4.71 | |
| MgCl₂ *6H₂O | 11.436 | 22.872 | 34.308 | |
| KCl | 0.877 | 1.754 | 2.631 | |
| Na₂SO₄ | 4.376 | 8.752 | 13.128 | |
| grams sodium acetate added | | | | |

NOTE: Biological growth occurs in this solution due to sulfate content. Use within 1 week of making.

2. Prepare a standardized Forties formation water (FW) brine.
   a. Add the following salts to a glass volumetric flask and bring to volume with DI water. Weigh all+/−0.01 grams.
   b. Buffer SW by adding 1 drop of acetic acid then enough saturated sodium acetate solution to reach pH 6.1. Record amount added.
   c. Filter brine through 0.45 µm membrane filter under vacuum to remove any dust particles that may affect test reproducibility.

TABLE 11

Forties formation water

| | FW | | | |
|---|---|---|---|---|
| | g/L | g/2 L | g/3 L | record actual |
| NaCl | 74.167 | 148.334 | 222.501 | |
| $CaCl_2 * 2H_2O$ | 10.304 | 20.608 | 30.912 | |
| $MgCl_2 * 6H_2O$ | 4.213 | 8.426 | 12.639 | |
| KCl | 0.709 | 1.418 | 2.127 | |
| $BaCl_2 * 2H_2O$ | 0.448 | 0.896 | 1.344 | |
| grams sodium acetate added | | | | |

2. Prepare a 1% (10,000 ppm) active polymer solution for each inhibitor to be tested.
   a. Weigh indicated grams of polymer into a volumetric flask and bring to volume with buffered, filtered seawater. Grams of polymer (g) required can be calculated by the formula below:

$$g=(V \times C)/S$$

where V is volume in ml, of volumetric flask, C is concentration of polymer required (as weight %), and S is solids (active) content (in weight %) of the polymer. Example: A polymer has a solids content of 35%. To create 100 ml, of a 1 wt % (10,000 ppm) solution:

$$g=(100 \times 1)/35=2.857 \text{ g of polymer in 100 mL of seawater}$$

3. Prepare a buffer solution.
   a. Add 8.2 g anhydrous sodium acetate to 100 g of DI water.
4. Prepare a quenching solution. Since barium sulfate forms readily on cooling, an effective dosage of scale inhibitor is required to prevent further precipitation after the test ends.
   a. Add 9 g KCl to a 3L volumetric flask. Dissolve with DI water.
   b. Add 1 active wt % ALCOFLOW 615 (~67.5 grams).

$$g=(3000 \times 1)/44.4=67.57 \text{ g of polymer in 3000 mL}$$

c. Bring to volume with DI water.

Part 2: Test Setup

5. Label 40 mL glass vials with inhibitor name and concentration to be tested and number 1 through max 30 samples. The numbers will indicate the run order for the test.
6. Add 15 mL of DI water to each vial numbered 1-3. These will be used to make the totals.
7. Add 15 mL of SW to each vial numbered 4-30.
8. Label a second set of glass vials with "FW".
9. Add 15 mL of FW to each vial.
10. Place FW and SW vials in incubator or oven, but do not heat.

Part 3: Test Period

11. Turn on incubator and set to heat to 80° C.
12. Prepare SW for test. To each SW vial numbered 7-30,
    a. Add 0.3 mL of sodium acetate buffer solution.
    b. Add the appropriate amount of scale inhibitor solution to give desired concentration for 30 mL of sample. Microliters (µl) of inhibitor solution required can be calculated by the formula below:

$$\mu l=[(V_1 \times C_1)/C_2] \times 1000$$

where $V_1$ is volume in mL of test sample (SW+FW), $C_1$ is concentration of polymer desired (in ppm), and $C_2$ is concentration of active polymer in inhibitor solution. Example: Desired test concentration is 50 ppm in a 30 mL sample size (SW+FW). Using a 10,000 ppm (1%) polymer solution:

$$\mu l=[(30 \times 50)/10,000] \times 1000=150 \text{ µl}$$

13. To each SW vial numbered 1-6,
    a. Add 0.3 mL of sodium acetate buffer solution.
    b. Add an equivalent amount of water in place of the average amount of scale inhibitor solution used to prepare samples.
    c. Vials 1-3 will be used to determine ppm Ba for totals.
    d. Vials 4-6 will be used to determine ppm Ba for blanks.
14. Heat solutions for a minimum of 2 hours.
15. At the end of 2 hours take one "FW" vial and #1 labeled SW out of the incubator/oven.
16. Pour the contents of the "FW" vial into the treated SW.
17. Return sample 1 to incubator/oven.
18. Set a timer to begin counting up for 2 hours. (This time period is critical.)
19. When 1 minute has passed, take one "FW" vial and #2 labeled SW out of the incubator/oven.
20. Return sample 2 to incubator/oven.
21. Repeat steps 17-19 with remaining numbered vials, keeping an interval of 1 minute between samples, until each "FW" has been added to a numbered vial.
22. Label a set of test tubes with inhibitor information or run number. These will be used for filtration step.
23. Weigh 5 g+/−0.02 g of quenching solution into each vial.

Part 4: Filtration

24. When the 2 hour period expires, take vial #1 out of the incubator/oven.
25. Filter ~5 g (record weight) into previously prepared vial containing quenching solution, ensuring that the labels on the vials match.
    a. Place open vial containing quenching solution on balance.
    b. Draw sample into a 5 mL luer-lok syringe.
    c. Fit syringe with 0.45 vim membrane syringe filter.
    d. Weigh 5 grams filtrate into vial. Record grams filtrate added (for ppm correction).
26. Repeat this process with each sample at 1 minute intervals, so that each sample has been under test conditions for exactly 2 hours.

Part 5: ppm Determination

27. Concentration of barium should be determined by ICP. All samples should be run the day of the test.
28. Percent inhibition can be calculated by the following calculation:

$$\% \text{ inhibition}=((S*d)-B)/(T-B), \text{ where}$$

S=ppm Ba in sample
d=dilution factor (grams filtrate+5 grams quenching solution)/grams filtrate
B=ppm Ba in blank
T=ppm Ba in total Additional Test Information:

TABLE 12

Sample Matrix

| | ppm m sample as tested | ½ dilution |
|---|---|---|
| Na | 20037 | 10019 |
| Ca | 1619 | 809 |
| Mg | 936 | 468 |
| K | 416 | 208 |
| Ba | 126 | 63 |
| SO$_4$ | 1480 | 740 |
| Cl | 25142 | 12571 |

Materials Needed:
calcium chloride dihydrate
sodium chloride
magnesium chloride hexahydrate
potassium chloride
barium chloride dehydrate
sodium sulfate
acetic acid
sodium acetate
polymers to be evaluated
ALCOFLOW 615
Equipment Needed:
Analytical balance
Sample vials The data in Table 12 below indicates that these materials are excellent barium sulfate inhibitors and compare well in performance with the synthetic polymers. This is true even when the graft copolymers contain more than 20% (Example 37) and in some cases more than 60% (Example 38) hydroxyl-containing natural moiety. These materials should pass the inherent and readily biodegradable as determined OECD 306b test.

TABLE 13

Barium Sulfate Inhibition

| | wt % natural synthetic (mol %) | % Solids | Mw | Mn | Residual (ppm) AA | MA | BaSO4 inhibition 10 ppm | 25 ppm | 50 ppm |
|---|---|---|---|---|---|---|---|---|---|
| Aquatreat 978 | Acrylic-maleic synthetic polymer | | | | | | | | —* |
| Example 37 | 25:75 (MA 33%, AA 67%) | 35.29 | 6444 | 1755 | 850 | 1060 | 64.37 | 97.36 | 98.96 |
| Example 38 | 65:35 (MA 33%, AA 67%) | 31.16 | 7372 | 1280 | 902 | 255 | 16.56 | 56.03 | 89.26 |

*Aquatreat 978 (available from Alco Chemical, Chattanooga, TN) precipitates out in the brine used in this test.

Example 40

The polymer of Example 38 was tested in all 3 of the brines detailed in Table 1. The data indicate that the polymer is very compatible in these brines.

TABLE 14

Brine Compatibility

| Polymer | Polymer concentration [ppm] | Brine 1 Observation after | | | Brine 2 Observation after | | | Brine 3 Observation after | | |
|---|---|---|---|---|---|---|---|---|---|---|
| | | 0 h, 21° C. | 1 h, 60° C. | 24 h, 90° C. | 0 h, 21° C. | 1 h, 60° C. | 24 h, 90° C. | 0 h, 21° C. | 1 h, 60° C. | 24 h, 90° C. |
| Example 38 | 250 | Y | Y | Y | Y | Y | Y | Y | Y | Y |
| | 1000 | Y | Y | Y | Y | Y | Y | Y | Y | Y |
| | 5000 | Y | Y | Y | Y | Y | Y | Y | Y | Y |
| | 25000 | Y | Y | Y | Y | Y | Y | Y | Y | Y |
| | 100000 | Y | Y | Y | Y | Y | Y | Y | Y | Y |

Y Compatible, clear solution

Uniform haze Hazy solution, no ppt settling

Redispersable ppt minimal ppt settles, but uniformly redisperses with minimal agitation X Precipate formed, either crystalline fiber-like structures or gross powder-like ppt By comparison a synthetic acrylate-maleate copolymer (Aquatreat 978 commercially available from Alco Chemical, Chattanooga Tenn.) showed much less brine compatibility as evidenced by the data below.

TABLE 15

Synthetic Brine Compatibility

| Inhibitor | Polymer concentration. [ppm] | Brine Number | Observation after | | | |
|---|---|---|---|---|---|---|
| | | | 0 h, 21° C. | 1 h, 60° C. | 2 h, 90° C. | 24 h, 90° C. |
| Aquatreat 978 | 250 | 1 | Y | Y | Y | Y |
| Aquatreat 978 | 1000 | 1 | Y | Y | Y | Y |
| Aquatreat 978 | 5000 | 1 | Y | Y | Y | Y |
| Aquatreat 978 | 25000 | 1 | Y | Y | Y | Y |
| Aquatreat 978 | 100000 | 1 | Y | Y | Y | Y |
| Aquatreat 978 | 250 | 2 | Y | turbid | turbid | turbid |
| Aquatreat 978 | 1000 | 2 | Y | Y | turbid | turbid |
| Aquatreat 978 | 5000 | 2 | Y | Y | turbid | turbid |
| Aquatreat 978 | 25000 | 2 | Y | Y | turbid | turbid |
| Aquatreat 978 | 100000 | 2 | Y | Y | Y | Y |
| Aquatreat 978 | 250 | 3 | X | X | X | X |
| Aquatreat 978 | 1000 | 3 | X | X | X | X |
| Aquatreat 978 | 5000 | 3 | X | X | X | X |
| Aquatreat 978 | 25000 | 3 | X | X | X | X |
| Aquatreat 978 | 100000 | 3 | X | X | X | X |

Example 41

Graft copolymer with 10 weight percent maltodextrin.

A reactor containing 150 grams of water, 90 grams of a 50% solution of NaOH, 10 grams of maltodextrin (Cargill MD™ 01960 dextrin) and 0.00075 grams of ferrous ammonium sulfate hexahydrate ('FAS') was heated to 98° C. A solution containing 90 grams of acrylic acid was added to the reactor over a period of 45 minutes. An initiator solution comprising 3.6 grams of 35% hydrogen peroxide solution in 30 grams of deionized water was simultaneously added to the reactor over a period of 60 minutes. The reaction product was held at 98° C. for an additional hour. The pH of the polymer solution was 7.

The graft copolymer of this Example with low levels of saccharide functionality (10 weight percent) was tested for brine compatibility in Brine 3. This polymer was found to be insoluble in Brine 3 when dosed at 250, 1,000, 5,000, 25,000 and 100,000 ppm levels.

Example 42

Graft copolymer with 10 weight percent maltodextrin 15 grams of maleic anhydride is dissolved in 250 grams of water and 135 grams of a 50% solution of NaOH is heated to 95 C and 10 grams of DE 11(Cargill MD™ 01960) dextrin, spray-dried maltodextrin obtained by enzymatic conversion of common corn starch, available from Cargill Inc., Cedar Rapids, Iowa) and 0.00113 grams of ferrous ammonium sulfate hexahydrate is added. A monomer solution containing 125 grams of acrylic acid is subsequently added to the reactor over a period of 5 hours. An initiator solution comprising of 5.4 grams of sodium persulfate and 45 grams of a 35% solution of hydrogen peroxide dissolved in 12.7 grams of water is added to the reactor over a period of 5.5 hours. The reaction product is held at 95° C. for 60 minutes.

The graft copolymer of this Example with low levels of saccharide functionality (10 weight percent) is tested for brine compatibility in Brine 3. The polymer is found to be insoluble in Brine 3 when dosed at 250, 1,000, 5,000, 25,000 and 100,000 ppm levels.

Example 43

The polymers synthesized in examples 36 and 38 were tested for compatibility in ethylene glycol—

TABLE

Ethylene Glycol Compatibility

| Polymer | Solubility of the polymer as a 1% solution in ethylene glycol | Solubility of the polymer as a 50% solution in ethylene glycol |
|---|---|---|
| Example 36 | Soluble | Soluble |
| Example 38 | Soluble | Soluble |

This data indicates that polymers of this invention are extremely soluble in ethylene glycol.

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:
1. A method of controlling scale in an aqueous system comprising adding a low molecular weight graft copolymer composition to the aqueous system in an amount sufficient to inhibit scale formation, said graft copolymer produced by free radical copolymerization of components comprising:
   a synthetic component formed from at least one or more olefinically unsaturated carboxylic acid monomers or salts thereof, and a natural component formed from a hydroxyl-containing natural moiety selected from the group consisting of maltodextrin, corn syrup solids, and mixtures thereof, wherein the number average molecular weight of the graft copolymer is about 100,000 or less, and the weight percent of the natural component in the graft copolymer is about 50 wt % or greater based on total weight of the graft copolymer.

2. The method of controlling scale in aqueous systems according to claim 1 wherein the composition is effective to inhibit formation of scale formed by calcium carbonate, halite, silicates, calcium phosphate, calcium sulfate, barium sulfate, strontium sulfate, iron sulfide, lead sulfide, zinc sulfide or mixtures thereof.

3. The method of controlling scale in aqueous systems according to claim 2 wherein the aqueous system is in an oil field application.

4. The method of controlling scale in aqueous systems according to claim 3 further comprising introducing the low molecular weight graft copolymer to the aqueous system in a carrier fluid.

5. The method of controlling scale in aqueous systems according to claim 4 wherein the carrier fluid is methanol.

6. The method of controlling scale in aqueous systems according to claim 3 further comprising injecting the low molecular weight graft copolymer into an oil-bearing rock formation matrix.

7. The method of controlling scale in aqueous systems according to claim 3 further comprising adding the low molecular weight graft copolymer topside to production water, and re-injecting the production water into the oil-bearing rock formation matrix.

8. The method of claim 2 wherein the graft copolymer is effective to inhibit greater than 80% calcium carbonate at about 50 ppm or less in aqueous solution.

9. The method of claim 1 wherein the maltodextrin has a dextrose equivalent (DE) of about 5 or greater.

10. The method of claim 9 wherein the maltodextrin is waxy.

11. The method of claim 1 wherein the free radical copolymerization utilizes metal ion catalyst.

12. The method of claim 1 wherein the carboxylic acid monomer is acrylic acid.

13. The method of claim 1 wherein the carboxylic acid monomer is a mixture of acrylic acid and maleic acid.

14. The method of claim 1 wherein the synthetic component is further formed from one or more monomers having a nonionic, hydrophobic and/or sulfonic acid group, wherein the one or more monomers are incorporated into the copolymer in an amount of about 50 weight percent or less based on total weight of the graft copolymer.

15. The method of claim 1 wherein the carboxylic acid monomer is selected from the group consisting of acrylic acid, methacrylic acid, itaconic acid, maleic acid, and mixtures thereof.

16. The method of claim 1 wherein the maltodextrin or corn syrup solids are hydrolyzed in situ during the free radical copolymerization.

17. The method of claim 1 wherein the maltodextrin or corn syrup solids are chemically modified or derivatized.

18. The method of claim 1 wherein the graft copolymer is soluble in sea water at up to about 1000 ppm.

* * * * *